United States Patent
Honma et al.

(10) Patent No.: US 10,241,187 B2
(45) Date of Patent: Mar. 26, 2019

(54) POSITION SENSOR, DIRECTION ESTIMATION METHOD, AND SYSTEM

(71) Applicant: Panasonic Intellectual Property Management Co., Ltd., Osaka (JP)

(72) Inventors: Naoki Honma, Iwate (JP); Takeshi Nakayama, Hyogo (JP); Takashi Morimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 323 days.

(21) Appl. No.: 15/383,243

(22) Filed: Dec. 19, 2016

(65) Prior Publication Data

US 2017/0184699 A1 Jun. 29, 2017

Related U.S. Application Data

(60) Provisional application No. 62/387,208, filed on Dec. 24, 2015.

(30) Foreign Application Priority Data

Jun. 10, 2016 (JP) ................. 2016-116623

(51) Int. Cl.

| | | |
|---|---|---|
| G01S 3/28 | (2006.01) | |
| G01S 3/48 | (2006.01) | |
| G01S 5/02 | (2010.01) | |
| G01S 3/04 | (2006.01) | |

(Continued)

(52) U.S. Cl.
CPC ................ *G01S 3/28* (2013.01); *G01S 3/043* (2013.01); *G01S 3/48* (2013.01); *G01S 3/74* (2013.01);

(Continued)

(58) Field of Classification Search
CPC ..... G01S 3/28; G01S 3/48; G01S 3/74; G01S 5/0252; G01S 5/0273; G01S 7/415

(Continued)

(56) References Cited

U.S. PATENT DOCUMENTS

| | | |
|---|---|---|
| 2006/0261968 A1 | 11/2006 | Shirakawa |
| 2013/0335257 A1 | 12/2013 | Abrahamson |
| 2016/0030006 A1 | 2/2016 | Okuya et al. |

FOREIGN PATENT DOCUMENTS

| | | |
|---|---|---|
| JP | 2006-329658 | 12/2006 |
| JP | 2014-512526 | 5/2014 |

(Continued)

OTHER PUBLICATIONS

Fadel Adib et al., "3D tracking via body radio reflections", 11th USENIX Symposium on Networked Systems Design & Implementation (USENIX NSDI'14), pp. 317-329, Apr. 2014.

(Continued)

*Primary Examiner* — Dao L Phan
(74) *Attorney, Agent, or Firm* — Greenblum & Bernstein, P.L.C.

(57) ABSTRACT

A sensor includes a reception antenna, a parasitic antenna terminating in a variable load, a controller, a transmitter transmitting a transmission signal, a receiver, a memory, and a processor. The controller sets an impedance value of the variable load. The receiver receives a first signal formed of signals received by the antennas and derived from the transmission signal, and the signal received by the parasitic antenna corresponding to the impedance value. The memory stores a first signal strength value of the first signal corresponding to the impedance value. The processor sets candidates of a complex propagation channel, calculates second signal strength values of a second signal respectively corresponding to the candidates, estimates a target complex propagation channel by selecting a candidate corresponding (Continued)

to a minimum difference among differences between the first signal strength value and the second signal strength values, and estimates a direction of arrival of the first signal.

8 Claims, 15 Drawing Sheets

(51) Int. Cl.
  *G01S 3/74* (2006.01)
  *G01S 7/41* (2006.01)
  *G01S 13/00* (2006.01)
  *G01S 13/48* (2006.01)
(52) U.S. Cl.
  CPC .......... *G01S 5/0252* (2013.01); *G01S 5/0273* (2013.01); *G01S 7/415* (2013.01); *G01S 13/003* (2013.01); *G01S 13/48* (2013.01)
(58) Field of Classification Search
  USPC ........................................................ 342/418
  See application file for complete search history.

(56) References Cited

FOREIGN PATENT DOCUMENTS

| JP | 2014-215200 | 11/2014 |
| JP | 2015-072173 | 4/2015 |
| JP | 2015-117961 | 6/2015 |
| JP | 2015-117972 | 6/2015 |
| JP | 2015-119770 | 7/2015 |
| JP | 2015-175700 | 10/2015 |

OTHER PUBLICATIONS

Dai Sasakawa et al., "Fast Estimation Algorithm for Living Body Radar", 2014 International Symposium on Antennas and Propagation (ISAP 2014), FR3D, pp. 583-584, Dec. 2014.

Cyril Plapous et al., "Reactance-Domain MUSIC Algorithm for ESPAR Antennas", Technical Report of the Institute of Electronics, Information and Communication Engineers, RCS2002-147, pp. 1-8, Aug. 2002.

POSITION SENSOR, DIRECTION ESTIMATION METHOD, AND SYSTEM

BACKGROUND

1. Technical Field

The present disclosure relates to a position sensor, a direction estimation method, and a system.

2. Description of the Related Art

As methods for sensing the position and state of a person, methods using radio signals are being studied (for example, see Japanese Unexamined Patent Application Publication No. 2015-117972, which is hereinafter referred to as PTL 1). PTL 1 discloses an estimation method and so on with which the position and state of a person, which is a detection target, can be sensed by analyzing components including a Doppler shift by using Fourier transform.

In the related art, however, a plurality of antennas capable of observing the delay time and phase information regarding an arriving wave are necessary, for example, and phase information regarding the transmitter side needs to be obtained in order to estimate the position and direction of a person.

SUMMARY

In one general aspect, the techniques disclosed here feature a position sensor including at least one reception antenna; at least one parasitic antenna terminating in a variable load; a controller that sets an impedance value of the variable load; a transmitter that transmits a transmission signal to a predetermined area in search of an organic body; a receiver that receives a first signal, the first signal being formed of a combination of a signal received by the reception antenna and a signal received by the parasitic antenna, the signal received by the reception antenna and the signal received by the parasitic antenna being derived from the transmission signal, and the signal received by the parasitic antenna corresponding to the set impedance value of the variable load; a memory that stores, when the impedance value of the variable load is set by the controller, a first signal strength value that indicates a strength of the first signal corresponding to the set impedance value of the variable load; and a processor that sets a plurality of complex propagation channel candidates indicating signal propagation properties between the transmitter and the receiver, calculates a plurality of second signal strength values when a second signal derived from another transmission signal transmitted from the transmitter is received by the receiver, each of the plurality of second signal strength values indicating a strength of the second signal, and the plurality of second signal strength values respectively corresponding to the plurality of complex propagation channel candidates, estimates a target complex propagation channel by selecting, from among the plurality of complex propagation channel candidates, a complex propagation channel candidate that corresponds to a minimum difference among differences between the first signal strength value and the plurality of second signal strength values, and estimates a direction of arrival of the first signal relative to the position sensor based on the target complex propagation channel.

According to the present disclosure, the direction in which a moving body is present and so on can be estimated from radio signals received on the receiving side without obtaining phase information regarding the transmitter side.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
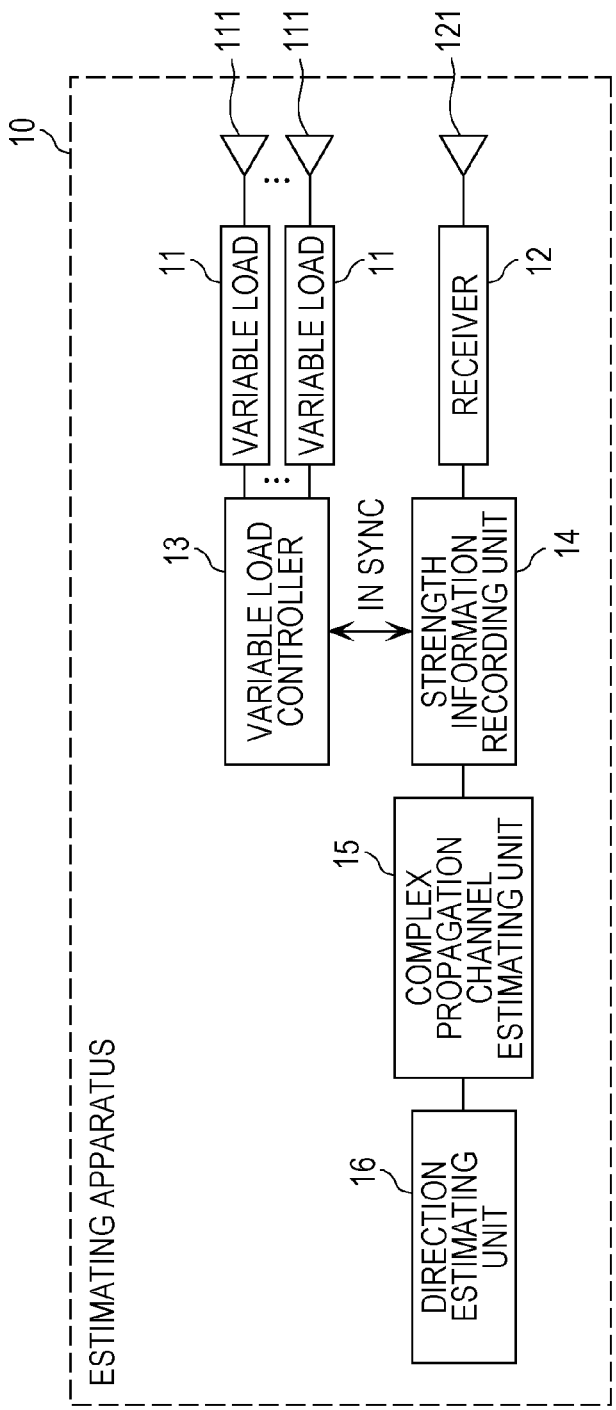
FIG. 1 is a block diagram illustrating an example configuration of an estimating apparatus according to a first embodiment.

Underlying Knowledge Forming Basis of the Present Disclosure

As methods for sensing the position and state of a person, methods using radio signals are being studied.

For example, PTL 1 discloses a method for sensing the position and state of a person, which is a detection target, by analyzing components including a Doppler shift by using Fourier transform. More specifically, in the method disclosed by PTL 1, an array antenna constituted by a plurality of antenna elements are used in both transmission and reception, and a complex propagation channel between the array antennas is observed first. Here, the complex propagation channel corresponds to information obtained by the reception antennas in order to estimate channel information indicating an attenuation and a phase rotation to which a transmission signal is subjected, and is represented by a matrix having a number of elements, the number being equal to the number of transmission antennas×the number of reception antennas. In the complex propagation channel, the absolute value of each element (complex propagation channel element) represents the amplitude, and the argument of each complex propagation channel element represents the phase. Next, a Fourier transform is performed on the time responses of the complex propagation channel elements to obtain a frequency response matrix. Thereafter, only alternating-current components are extracted. This operation is equivalent to extracting Doppler-shift components. Note that the extracted alternating-current components are also represented by a matrix. Then, a correlation matrix is obtained from the alternating-current components of the frequency response matrix and the direction of arrival is estimated to thereby detect the direction and position of the detection target.

For example, Japanese Unexamined Patent Application Publication Nos. 2015-072173 and 2015-119770, Japanese Patent Application No. 2013-558810, and Japanese Unexamined Patent Application Publication No. 2014-215200 (hereinafter referred to as PTL 2, PTL 3, PTL 4, and PTL 5 respectively) disclose methods in which Doppler components derived from a person (living body), which is a detection target, are extracted by performing a Fourier transform on an observed signal and are analyzed to thereby sense the position of the living body and the state thereof, such as heartbeat and breathing, as in PTL 1. Japanese Unexamined Patent Application Publication No. 2015-117961 (hereinafter referred to as PTL 6) discloses a method in which a high-speed beam scan is performed while adjusting a variable impedance array and the direction of a signal arriving from a target is estimated on the basis of the reflection wave. Japanese Unexamined Patent Application Publication No. 2006-329658 (hereinafter referred to as PTL 7) discloses a method in which directional sensors using a plurality of frequencies are disposed in different directions and the distance to and the angle of a target are estimated on the basis of the reflection waves to thereby estimate the position of the target object. For example, Japanese Unexamined Patent Application Publication No. 2015-175700 (hereinafter referred to as PTL 8) discloses a method in which a plurality of antennas capable of observing the delay time and phase information regarding an arriving wave are provided and the position of a target object is estimated.

For example, F. Adib, Z. Kabelac, D. Katabi, and R. Miller, "3D tracking via body radio reflections", 11th USENIX Symposium on Networked Systems Design & Implementation (USENIX NSDI'14), April 2014 (hereinafter referred to as NPL 1) discloses a method for detecting the direction and position of a human body without performing a Fourier transform. According to NPL 1, as a method for extracting varying components without performing a Fourier transform, a propagation response in a person-absent state is measured in advance, a difference observed in the person-absent state and in a person-present state is assumed to be caused by a person, and the difference component is analyzed to thereby estimate the position of the person. More specifically, a frequency response having a wide band of 1 GHz or more is observed and the propagation times of the reflection waves derived from the extracted person are calculated to thereby estimate the distances from a plurality of antennas disposed at different places and estimate the position of the person by using the estimated distances. According to NPL 1, the time response of a complex propagation channel in the person-present state is observed, and a subtraction is performed on complex propagation channels at different times to thereby extract only reflection waves which are derived from a person and from which reflection components from fixed objects, such as walls and furniture, are removed.

For example, Dai Sasakawa, Keita Konno, Naoki Honma, Kentaro Nishimori, Nobuyasu Takemura, Tsutomu Mitsui, "Fast Estimation Algorithm for Living Body Radar", 2014 International Symposium on Antennas and Propagation (ISAP 2014), FR3D, pp. 583-584, December 2014 (hereinafter referred to as NPL 2) discloses a method for estimating the direction of a living body by removing unwanted components from a complex transfer function in the person-present state. More specifically, in order to remove, from the complex transfer function, reflection waves from fixed objects, such as walls and furniture, and direct waves between a transmission antenna and a reception antenna, a complex transfer function in the person-absent state is measured in advance. Then, the time response of a complex propagation channel in the person-present state is observed. The complex transfer function in the person-present state includes reflection waves from fixed objects and direct waves between the transmission antenna and the reception antenna. Therefore, by subtracting the complex transfer function in the person-absent state from the complex transfer function in the person-present state, reflection components (unwanted components) from the fixed objects are removed, and only reflection waves derived from the person are extracted.

For example, Cyril Plapous, Jun Cheng, Eddy Taillefer, Akifumi Hirata, Takashi Ohira, "Reactance-Domain MUSIC Algorithm for ESPAR Antennas", Technical Report of The Institute of Electronics, Information and Communication Engineers, RCS2002-147, pp. 1-8, August 2002 (hereinafter referred to as NPL 3) discloses a method for estimating the direction of arrival of a radio wave by using parasitic antennas. NPL 3 discloses an apparatus including a single-element fed antenna and a plurality of parasitic antennas that surround the fed antenna, that is, an apparatus in which a single receiver capable of observing a phase is connected to a single-element reception antenna (fed antenna) and a plurality of parasitic antennas to which variable loads are connected are disposed circularly around the reception antenna. A reception signal received by the receiver changes in accordance with the values of the variable loads of the parasitic antennas. Therefore, the direction of arrival of a radio wave can be estimated from a response obtained when the values of the variable loads of the parasitic antennas are changed (from a complex signal received at this time).

Single-element antennas disclosed by PTL 4 and 5, for example, are adequate to only detect a Doppler shift caused by breathing or heartbeat of a person; however, in order to estimate the position and direction of a person, a plurality of antennas capable of observing the delay time and phase information regarding an arriving wave are necessary. That is, the single-element antennas disclosed by PTL 4 and 5 are unable to estimate the direction and position of a person.

In the methods disclosed by PTL 1 to 3 and 6 and the methods disclosed by NPL 1 and 2, a plurality of antennas are used, and therefore, the direction and position of a person can be estimated. However, in order to estimate the direction and position of a person, a plurality of precision receivers capable of measuring the delay time and phase of a signal are necessary. This results in an increased cost of the apparatus, which is a problem.

In the method disclosed by NPL 3, the direction of an arriving wave is estimated from a response obtained while the values of the variable loads of the parasitic antennas are changed, as described above. However, in the method disclosed by NPL 3, the same reception signal needs to arrive each time the values of the variable loads are changed, and further, it is necessary to know the precise phase value of the reception signal, which is a problem. This means that the reference oscillator of the transmitter needs to be in complete synchronization with that of the receiver at the phase level or that a common reference oscillator needs to be used. That is, in a case where the transmitter is disposed away from the receiver, for example, it is difficult to connect the transmitter and the receiver with each other, and therefore, a high-cost reference oscillator capable of providing synchronization at the phase level is necessary, which is a problem. This is because variations in a complex propagation channel caused by a living body occur in cycles of about one second, and a synchronous state at the phase level needs to be maintained at least within the cycle. Further, determination needs to be performed as to whether a variation in the complex propagation channel is caused by a living body or by a frequency difference between the reference oscillator of the transmitter and that of the receiver.

With the method disclosed by PTL 6, direction estimation in a narrow area can be performed by using narrow-directional beams; however, wide-directional beams are necessary for direction estimation in a wide area. That is, in the method disclosed by PTL 6, no transmitter is necessary, and therefore, phase information regarding the transmitter side is not necessary; however, the resolution in direction estimation is low, which is an issue. Similarly, with the method disclosed by PTL 7, in a case of direction estimation in a wide area, if the number of antennas is decreased, the overlapping area of the antennas becomes narrow, and the resolution in direction estimation becomes low, which is an issue.

Currently, radars using an array antenna for estimating, in a radio wave propagation environment in which multiple waves are present, the direction in which a living body is present and so on are being studied by using a phenomenon that a living body causes a Doppler shift in a radio wave by some activities, such as breathing and heartbeat. That is, radars for estimating the direction of a living body are being studied in which a radio wave is emitted to the living body and a signal component that is not derived from the living body is removed by performing a Fourier transform on the reception signal to thereby estimate the direction of arrival of a radio wave reflected by the living body.

However, in order to configure such an array antenna, a receiver is necessary for each antenna element and the hardware scale increases, which is a problem. Further, it is necessary to accurately know a phase difference of a reception signal between the antenna elements, which also causes an increase in the hardware scale.

In consideration of the above problems, the present inventors have devised a direction estimation method and so on with which the direction in which a moving body is present and so on can be estimated from radio signals received on the receiving side having a simple hardware configuration (with a smaller number of receivers) without obtaining phase information regarding the transmitter side.

(1) A position sensor according to an aspect of the present disclosure includes: at least one reception antenna; at least one parasitic antenna terminating in a variable load; a controller that sets an impedance value of the variable load; a transmitter that transmits a transmission signal to a predetermined area in search of an organic body; a receiver that receives a first signal, the first signal being formed of a combination of a signal received by the reception antenna and a signal received by the parasitic antenna, the signal received by the reception antenna and the signal received by the parasitic antenna being derived from the transmission signal, and the signal received by the parasitic antenna corresponding to the set impedance value of the variable load; a memory that stores, when the impedance value of the variable load is set by the controller, a first signal strength value that indicates a strength of the first signal corresponding to the set impedance value of the variable load; and a processor that sets a plurality of complex propagation channel candidates indicating signal propagation properties between the transmitter and the receiver, calculates a plurality of second signal strength values when a second signal derived from another transmission signal transmitted from the transmitter is received by the receiver, each of the plurality of second signal strength values indicating a strength of the second signal, and the plurality of second signal strength values respectively corresponding to the plurality of complex propagation channel candidates, estimates a target complex propagation channel by selecting, from among the plurality of complex propagation channel candidates, a complex propagation channel candidate that corresponds to a minimum difference among differences between the first signal strength value and the plurality of second signal strength values, and estimates a direction of arrival of the first signal relative to the position sensor based on the target complex propagation channel.

(2) In the aspect described above, the processor may estimate a first complex propagation channel as the target complex propagation channel if a temporal variation in the first signal strength value is equal to or smaller than a predetermined value, estimate a second complex propagation channel as the target complex propagation channel if the temporal variation in the first signal strength value is larger than the predetermined value, calculate a first correlation matrix that is a correlation matrix corresponding to the first complex propagation channel, calculate a second correlation matrix that is a correlation matrix corresponding to the second complex propagation channel, calculates a third correlation matrix by subtracting the first correlation matrix from the second correlation matrix, and estimate the direction of arrival of the first signal relative to the position sensor based on the third correlation matrix.

(3) In the aspect described above, the first signal does not include a reflection signal generated by the transmission signal being reflected by the organic body when the temporal variation in the first signal strength value is equal to or smaller than the predetermined value, and the first signal may include the reflection signal when the temporal variation in the first signal strength value is larger than the predetermined value.

(4) In the aspect described above, the processor may estimate a first complex propagation channel as the target complex propagation channel at a first time point, estimate a second complex propagation channel as the target complex propagation channel at a second time point after the first time point, calculate a phase difference between the first complex propagation channel and the second complex propagation channel, determine a phase angle at which the phase difference is minimized, calculate a third complex propagation channel by subtracting the first complex propagation channel to which the phase angle is applied from the second complex propagation channel to which the phase angle is applied, calculate a correlation matrix that corresponds to the third complex propagation channel, and estimate the direction of arrival of the first signal relative to the position sensor based on the target correlation matrix.

(5) A position sensor according to another aspect of the present disclosure includes: at least one reception antenna; at least one parasitic antenna terminating in a variable load; a controller that sets an impedance value of the variable load to K different values, K being an integer equal to or larger than two; a receiver that receives a first signal, the first signal being formed of a combination of a signal received by the reception antenna and a signal received by the parasitic antenna, the signal received by the reception antenna and the signal received by the parasitic antenna being derived from a transmission signal transmitted via a transmitter from the position sensor to a predetermined area in search of an organic body, the signal received by the parasitic antenna corresponding to the set impedance value of the variable load, the first signal being received L times for each of the K different values set as the impedance value of the variable load, and L being an integer equal to or larger than two; a memory that stores L first signal strength values for each of the K different values set as the impedance value of the variable load; and a processor that calculates average values by averaging the L first signal strength values for each of the K different values set as the impedance value of the variable load, calculates K×L second signal strength values by subtracting, from the L first signal strength values for each of the K different values set as the impedance value of the variable load, a corresponding average value of the average values, sets, for each of L complex propagation channels, M candidates each having K elements, M being an integer equal to or larger than two, the complex propagation channels indicating signal propagation properties between the transmitter and the receiver, calculates, for each of the L complex propagation channels, M third signal strength values each having K elements indicating signal strength values of signals to be received by the receiver when the impedance value of the variable load is set to the K different values, estimates the L complex propagation channels by selecting, for each of the L complex propagation channels, from among the M candidates, a candidate that corresponds to a minimum difference among differences between the M third signal strength values and corresponding second signal strength values of the second signal strength values, calculates a correlation matrix that corresponds to the L complex propagation channels, and estimates a direction of arrival of the first signal relative to the position sensor based on the correlation matrix.

(6) A system according to another aspect of the present disclosure includes: a first position sensor disposed at a first position; a second position sensor disposed at a second position different from the first position; and a first processor, wherein the first position sensor includes: at least one first reception antenna, at least one first parasitic antenna terminating in a first variable load, a first controller that sets an impedance value of the first variable load, a first transmitter that transmits a first transmission signal to a first predetermined area in search of an organic body, a first receiver that receives a first signal, the first signal being formed of a combination of a signal received by the first reception antenna and a signal received by the first parasitic antenna, the signal received by the first reception antenna and the signal received by the first parasitic antenna being derived from the first transmission signal, the signal received by the first parasitic antenna corresponding to the set impedance value of the first variable load, a first memory that stores, when the impedance value of the first variable load is set by the first controller, a first signal strength value that indicates a strength of the first signal corresponding to the set impedance value of the first variable load, and a second processor that sets a plurality of first complex propagation channel candidates indicating signal propagation properties between the first transmitter and the first receiver, calculates a plurality of second signal strength values when a second signal derived from a second transmission signal transmitted from the first transmitter is received by the first receiver, each of the plurality of second signal strength values indicating a strength of the second signal, the plurality of second signal strength values respectively corresponding to the plurality of first complex propagation channel candidates, estimates a target first complex propagation channel by selecting, from among the plurality of first complex propagation channel candidates, a first complex propagation channel candidate that corresponds to a minimum difference among differences between the first signal strength value and the plurality of second signal strength values, and estimates a first direction of arrival of the first signal relative to the first position sensor based on the target first complex propagation channel, the second position sensor includes: at least one second reception antenna, at least one second parasitic antenna terminating in a second variable load, a second controller that sets an impedance value of the second variable load, a second transmitter that transmits a third transmission signal to a second predetermined area in search of the organic body, a second receiver that receives a third signal, the third signal being formed of a combination of a signal received by the second reception antenna and a signal received by the second parasitic antenna, the signal received by the second reception antenna and the signal received by the second parasitic antenna being derived from the third transmission signal, and the signal received by the second parasitic antenna corresponding to the set impedance value of the second variable load, a second memory that stores, when the impedance value of the second variable load is set by the second controller, a third signal strength value that indicates a strength of the third signal corresponding to the set impedance value of the second variable load, and a third processor that sets a plurality of second complex propagation channel candidates indicating signal propagation properties between the second transmitter and the second receiver, calculates a plurality of fourth signal strength values when a fourth signal derived from a fourth transmission signal transmitted from the second transmitter is received by the second receiver, each of the plurality of fourth signal strength values indicating a strength of the fourth signal, the plurality of fourth signal strength values respectively corresponding to the plurality of second complex propagation channel candidates, estimates a target second complex propagation channel by selecting, from among the plurality of second complex propagation channel candidates, a second complex propagation channel candidate that corresponds to a minimum difference among differences between the third signal strength value and the plurality of fourth signal strength values, and estimates a second direction of arrival of the third signal relative to the second position sensor based on the target second complex propagation channel, and the first processor estimates a position of the organic body relative to the first position sensor and the second position sensor based on the first direction of arrival and the second direction of arrival.

Note that the present disclosure can be implemented not only as an apparatus but also as an integrated circuit that includes processing units constituting the apparatus, as a method that includes steps corresponding to the processing units constituting the apparatus, as a program that causes a computer to perform the steps, or as information, data, or a signal that represents the program. The program, information, data, and signal may be distributed via a recording medium, such as a compact disc read-only memory (CD-ROM), or a communication medium, such as the Internet.

Hereinafter, embodiments of the present disclosure will be described in detail with reference to the drawings. Note that all of the embodiments described below represent specific preferred examples of the present disclosure. Numerical values, forms, materials, constituent elements, the arrangements and connections of the constituent elements, steps, the order of the steps, and so on described in the following embodiments are examples and are not intended to limit the present disclosure. Among the constituent elements described in the following embodiments, any constituent element that is not described in independent claims, which set forth the most generic concept of the present disclosure, is described as an optional constituent element that constitutes a preferred mode. In the description and drawings, constituent elements having substantially the same functional configurations are assigned the same reference numerals, and a duplicated description thereof is omitted.

First Embodiment

A description of an estimating apparatus 10 according to a first embodiment that estimates the direction of a moving body (living body), which is a detection target, is given below with reference to the drawings.
Configuration of Estimating Apparatus 10

Figure 2:
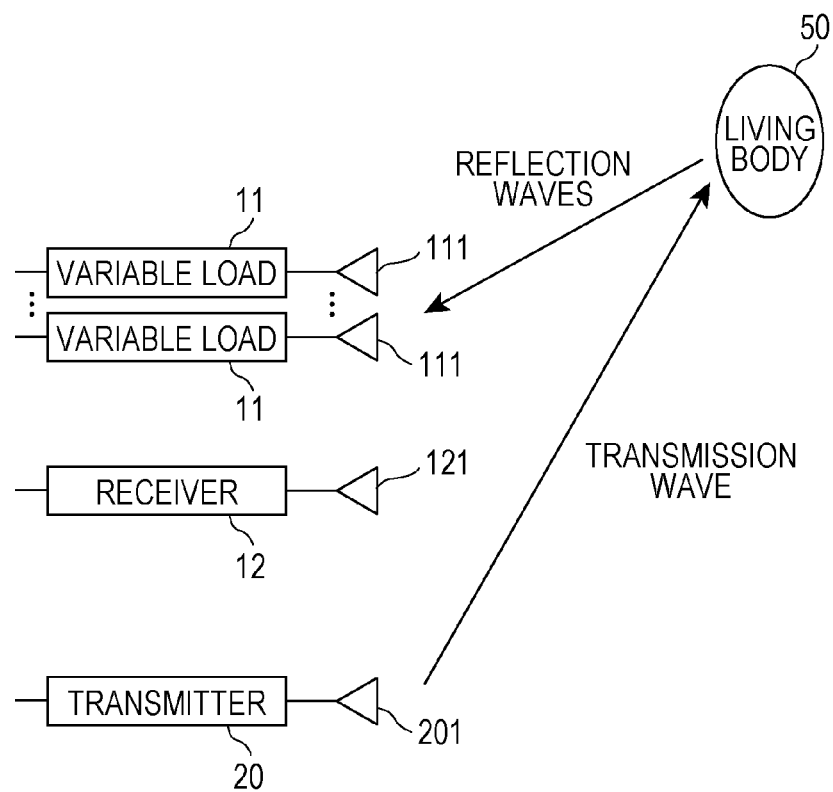
FIG. 2 is a diagram illustrating an example detection target of the estimating apparatus illustrated in FIG. 1.

FIG. 1 is a block diagram illustrating an example configuration of the estimating apparatus 10 according to the first embodiment. FIG. 2 is a diagram illustrating an example detection target of the estimating apparatus 10 illustrated in FIG. 1.

The estimating apparatus 10 illustrated in FIG. 1 includes one or more parasitic antennas 111 respectively terminating in variable loads 11, at least one reception antenna 121, a receiver 12, a variable load controller 13, a strength information recording unit 14, a complex propagation channel estimating unit 15, and a direction estimating unit 16 and estimates the direction in which a moving body (living body), which is a detection target, is present.
Receiver 12

The receiver 12 is connected to the at least one reception antenna 121 and receives a first signal from the reception antenna 121. The receiver 12 is capable of observing only the signal strength. The one or more parasitic antennas 111 respectively terminating in the variable loads 11 are called electronically steerable passive array radiator (ESPAR) antennas.

More specifically, as illustrated in FIG. 2, a signal (transmission wave) generated by a transmitter 20 is transmitted via a single transmission antenna 201 connected to the transmitter 20. Then, signals (reflection waves) that reach the parasitic antennas 111 are scattered by the variable loads 11, reach the parasitic antennas 111 again, and thereafter reach the reception antenna 121 through mutual coupling. That is, the receiver 12 observes the strength of a signal (first signal) that is formed of a combination of a signal (reflection wave or the like) directly reaching the reception antenna 121 and the signals coming via the parasitic antennas 111 as strength information (first signal strength).
Variable Load Controller 13

The variable load controller 13 controls the variable loads 11. More specifically, the variable load controller 13 controls the values (impedance values) of the variable loads 11.
Strength Information Recoding Unit 14

The strength information recording unit 14 accumulates the values of the variable loads 11 that are changed and the first signal strength of the first signal received by the receiver 12 when the variable loads 11 have the changed values. More specifically, the strength information recording unit 14 records strength information (first signal strength) regarding the first signal received by the receiver 12 in synchronization with the variable load controller 13. That is, the strength information recording unit 14 chronologically records the first signal strength (strength information) that changes in accordance with changes in the variable loads 11. Note that, in this embodiment, only amplitude information is recorded as first signal information (strength information). That is, it is not possible to observe the phase.
Complex Propagation Channel Estimating Unit 15

Figure 3:
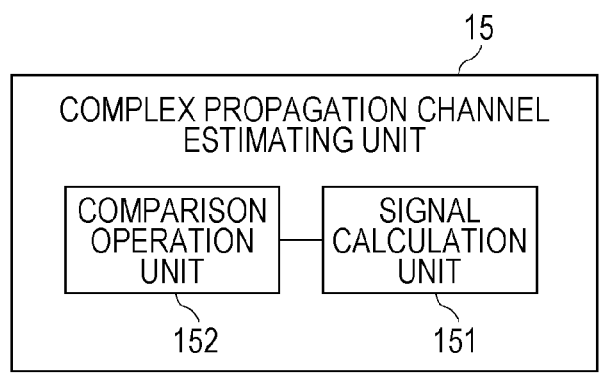
FIG. 3 is a diagram illustrating an example detailed configuration of a complex propagation channel estimating unit illustrated in FIG. 1.

FIG. 3 is a diagram illustrating an example detailed configuration of the complex propagation channel estimating unit 15 illustrated in FIG. 1.

The complex propagation channel estimating unit 15 includes a signal calculation unit 151 and a comparison operation unit 152, as illustrated in FIG. 3. The signal calculation unit 151 calculates a second signal strength of a second signal from a test complex propagation channel set to a predetermined value. The comparison operation unit 152 searches for a value of the test complex propagation channel with which the difference between the first signal strength and the second signal strength is minimized by using the values of the variable loads 11. The comparison operation unit 152 estimates the test complex propagation channel having the found value as a complex propagation channel at the time when the receiver 12 receives the first signal. In doing so, the complex propagation channel estimating unit 15 estimates the complex propagation channel at the time when the receiver 12 receives the first signal on the basis of strength information output from the strength information recording unit 14.

Direction Estimating Unit 16

The direction estimating unit 16 estimates the direction of arrival of the first signal from the complex propagation channel estimated by the complex propagation channel estimating unit 15. In this embodiment, the first signal corresponds to reflection waves from a living body 50, as illustrated in FIG. 2. Therefore, the direction estimating unit 16 is capable of estimating the direction in which the living body 50 is present from the complex propagation channel estimated by the complex propagation channel estimating unit 15.

Operations Performed by Estimating Apparatus 10

Figure 4:
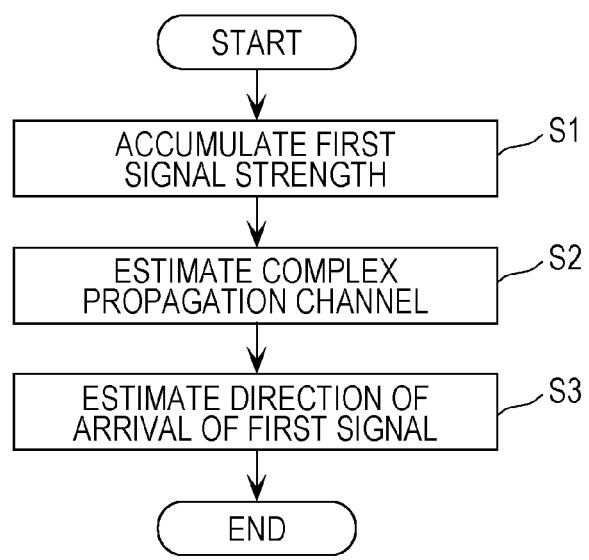
FIG. 4 is an overall flowchart of a direction estimation process performed by the estimating apparatus according to the first embodiment.

A description is given of operations in an estimation process performed by the estimating apparatus 10 that is configured as described above. FIG. 4 is an overall flowchart of a direction estimation process performed by the estimating apparatus 10 according to the first embodiment.

First, the estimating apparatus 10 accumulates the values of the variable loads 11 that are changed and the first signal strength of the first signal received by the receiver 12 when the variable loads 11 have the changed values (step S1).

Next, the estimating apparatus 10 calculates the second signal strength of the second signal from a test complex propagation channel set to a predetermined value and searches for a value of the test complex propagation channel with which the difference between the first signal strength and the second signal strength is minimized by using the values of the variable loads 11. Then, the estimating apparatus 10 estimates the test complex propagation channel having the found value as a complex propagation channel at the time when the receiver 12 receives the first signal (step S2).

Subsequently, the estimating apparatus 10 estimates the direction of arrival of the first signal from the complex propagation channel estimated in step S2 (step S3).

Now, a detailed description of the direction estimation process performed by the estimating apparatus 10 described with reference to FIG. 4 is given below with reference to FIG. 5 and FIGS. 6A and 6B.

Figure 5:
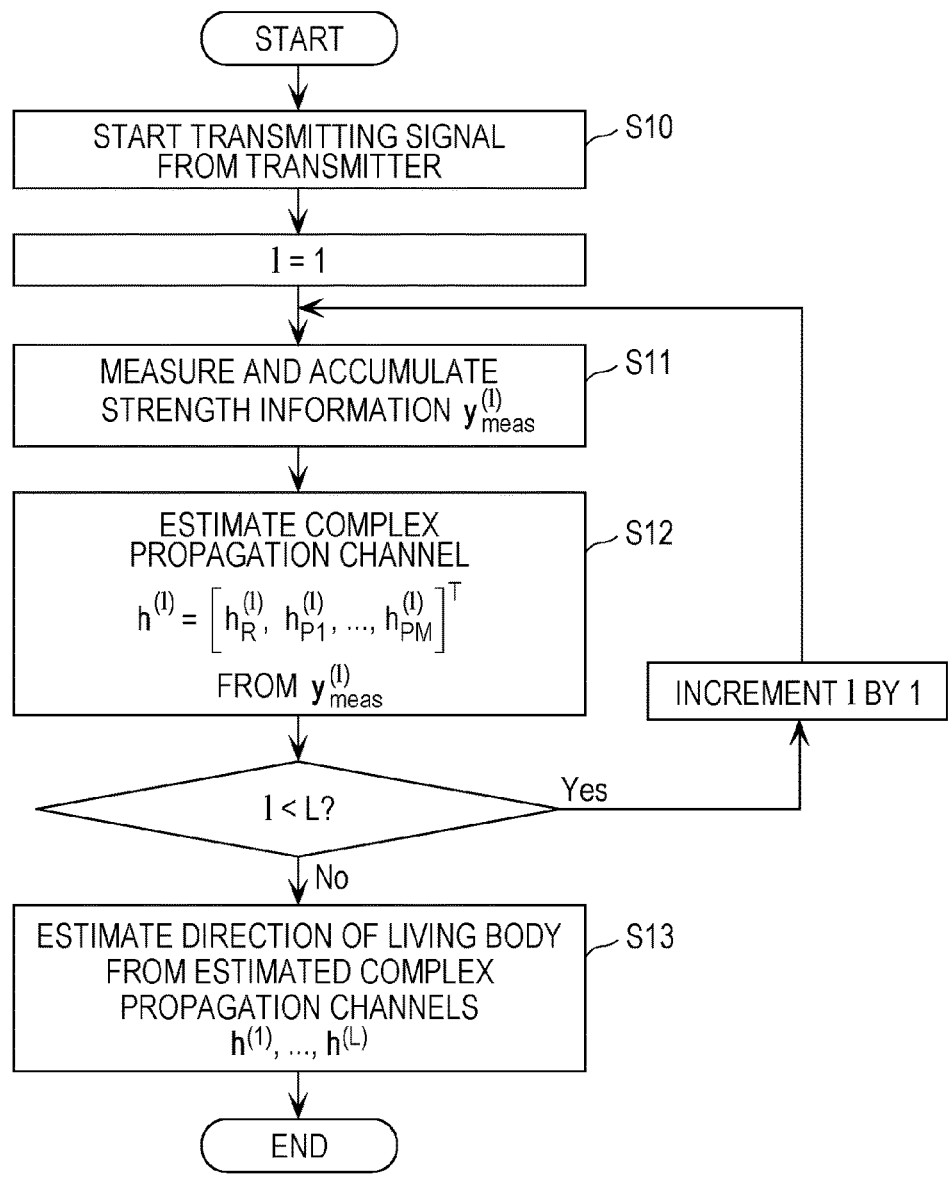
FIG. 5 is a detailed flowchart of the direction estimation process performed by the estimating apparatus according to the first embodiment.

FIG. 5 is a detailed flowchart of the direction estimation process performed by the estimating apparatus 10 according to the first embodiment. FIG. 6A is a detailed flowchart of step S12 illustrated in FIG. 5. FIG. 6B is a detailed flowchart of step S13 illustrated in FIG. 5.

First, the transmitter 20 starts transmitting a signal, as illustrated in FIG. 5 (step S10). In this embodiment, the transmitter 20 illustrated in FIG. 2 transmits a signal (transmission wave) via the transmission antenna 201.

Next, the estimating apparatus 10 measures and accumulates strength information $y^{(I)}_{meas}$ (step S12). Here, the strength information $y^{(I)}_{meas}$ represents the first signal strength of the first signal received by the receiver 12, where I represents an index number and indicates the number of the estimation concerned among the sequence of estimations in which the complex propagation channel is estimated from the strength information.

Figure 6A:
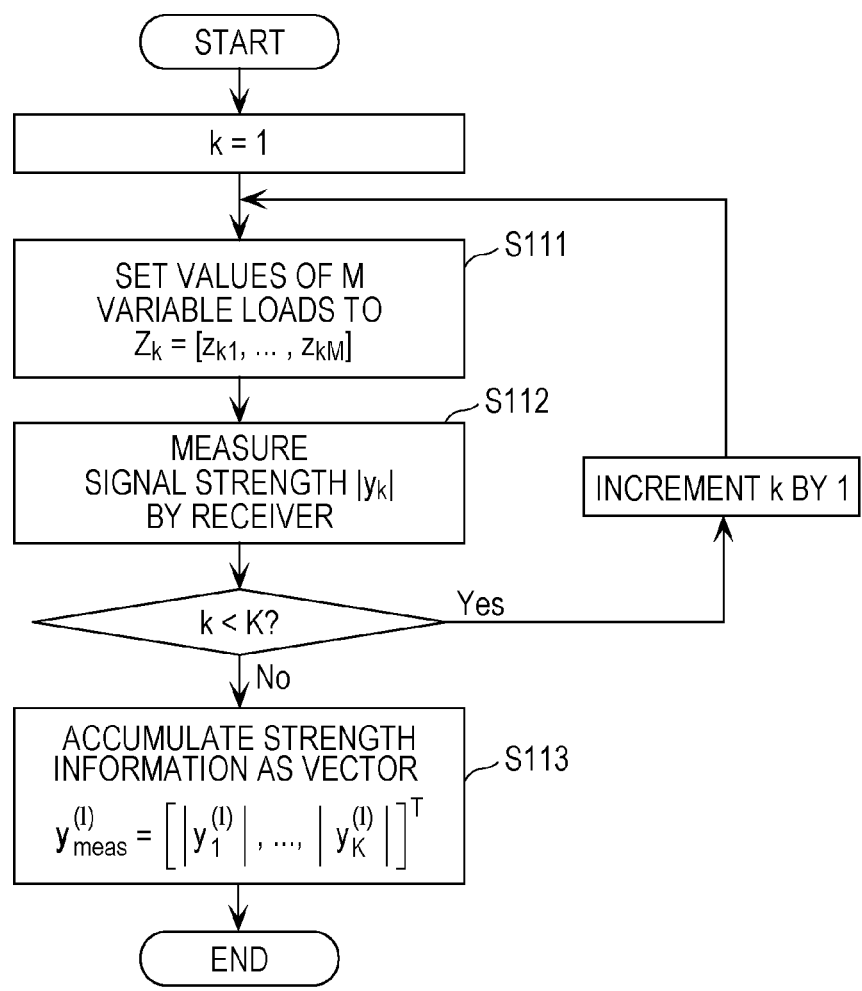
FIG. 6A is a detailed flowchart of a step illustrated in FIG. 5.

More specifically, first, the variable load controller 13 sets the values of M variable loads 11, as illustrated in FIG. 6A (step S111). Here, a description is given while assuming that the estimating apparatus 10 includes M parasitic antennas that respectively terminate in the variable loads 11. In this case, the values of the M variable loads 11 (the values of the variable impedances) are expressed by $Z_k = [z_{k1}, \ldots, z_{kM}]$, where k indicates the number of the test concerned among the sequence of tests. Subsequently, the receiver 12 measures the signal strength $|y_k|$ (step S112). Note that the estimating apparatus 10 repeats the process in steps S111 and S112 while changing the values of the M variable loads 11. The estimating apparatus 10 measures the signal strength $|y_k|$ while changing the values of the M variable loads 11 to K combinations of values. The K combinations of values, each of which is represented by $Z_k$, of the M variable loads 11 are different from one another ($Z_1 \neq Z_2 \ldots \neq Z_K$). The strength information recording unit 14 accumulates the strength information $y^{(I)}_{meas}$ measured by the receiver 12 when the values of the M variable loads 11 are changed to the K different combinations of values (step S113). K pieces of the strength information $y^{(I)}_{meas}$ thus obtained can be expressed by a vector as follows:

$$y^{(I)}_{meas} = [|y_1^{(I)}|, \ldots, |y_K^{(I)}|]^T$$

where I represents the index number described above and $[\cdot]^T$ represents transposition.

Next, the estimating apparatus 10 estimates from the strength information $y^{(I)}_{meas}$ a complex propagation channel $h^{(I)}$ at the time when the receiver 12 receives the first signal (step S12).

Figure 6B:
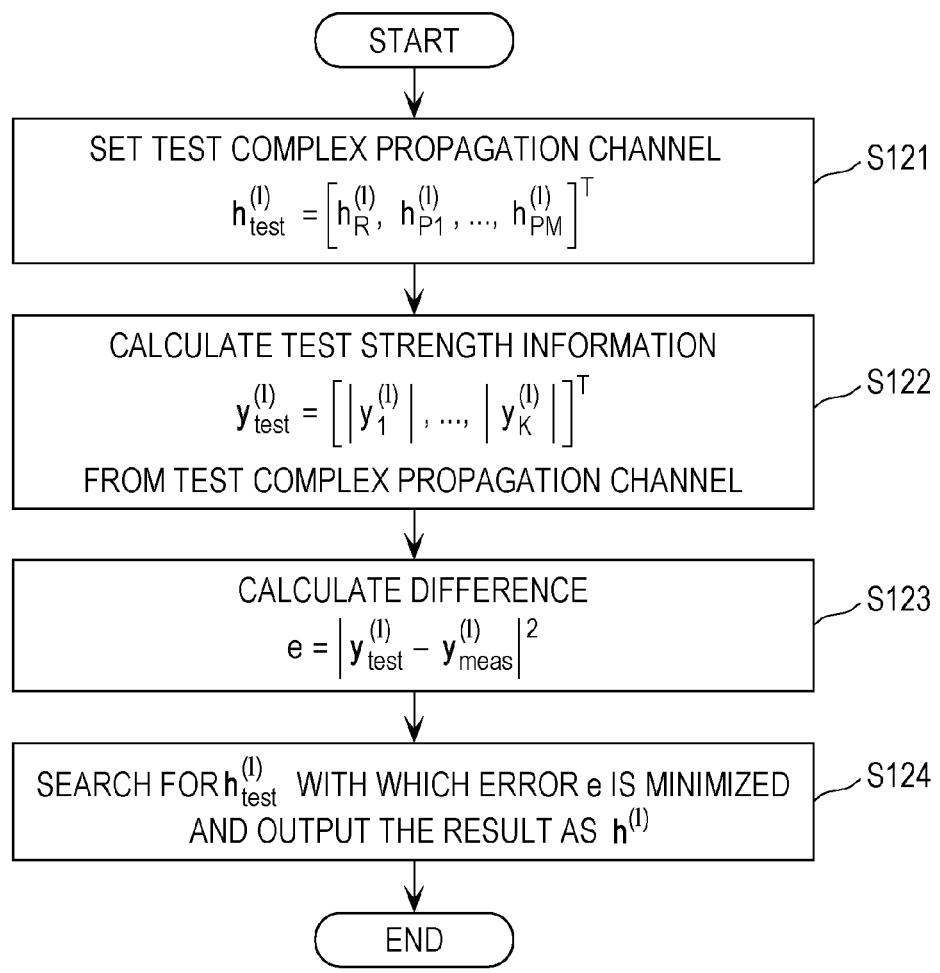
FIG. 6B is a detailed flowchart of a step illustrated in FIG. 5.

More specifically, first, the complex propagation channel estimating unit 15 sets a test complex propagation channel $h^{(I)}_{test}$, as illustrated in FIG. 6B (step S121). Here, the test complex propagation channel $h^{(I)}_{test}$ is set to a certain value (real part and imaginary part), that is, a predetermined value as follows.

$$h_{test}^{(I)} = [h_R^{(I)}, h_{P1}^{(I)}, \ldots, h_{PM}^{(I)}]^T$$

Subsequently, the complex propagation channel estimating unit 15 calculates test strength information $y^{(I)}_{test}$ from the test complex propagation channel $h^{(I)}_{test}$ (step S122). Here, the test strength information $y^{(I)}_{test}$ is strength information regarding a signal supposed to be received by the receiver 12 when the values of the variable loads 11 are known in step S11, and corresponds to the second signal strength of the second signal described above. The test strength information $y^{(I)}_{test}$ is calculated as follows.

$$y_{test}^{(I)} = [|y_1^{(I)}|, \ldots, |y_k^{(I)}|]^T$$

Subsequently, the complex propagation channel estimating unit 15 calculates the difference (error e) between the strength information $y^{(I)}_{meas}$, which is the first signal strength of the first signal, and the test strength information $y^{(I)}_{test}$, which is the second signal strength of the second signal (step S123), where the difference (error e) is calculated by using equation 1 below.

$$e = |y_{test}^{(I)} - y_{meas}^{(I)}|^2 \qquad \text{equation 1}$$

Subsequently, the complex propagation channel estimating unit 15 searches for a value of the test complex propagation channel $h^{(I)}_{test}$ with which the difference e becomes small, and outputs the test complex propagation channel $h^{(I)}_{test}$ having a value with which the difference e is minimized as the complex propagation channel $h^{(I)}$ (step S124).

Referring back to FIG. 5, the rest of the description is given.

The estimating apparatus 10 performs the measurement process in step S11 described above L times and performs the estimation process in step S12 described above each time the measurement process is performed.

Next, the estimating apparatus 10 estimates the direction of the living body 50 from the complex propagation channels $h^{(1)}, \ldots, h^{(L)}$ estimated in step S12 (step S13).

Principle of Estimation Process

Now, a description of a principle based on which the complex propagation channel estimating unit 15 estimates the test strength information $y^{(I)}_{test}$ (second signal strength) from the test complex propagation channel $h^{(I)}_{test}$ is given.

Figure 7A:
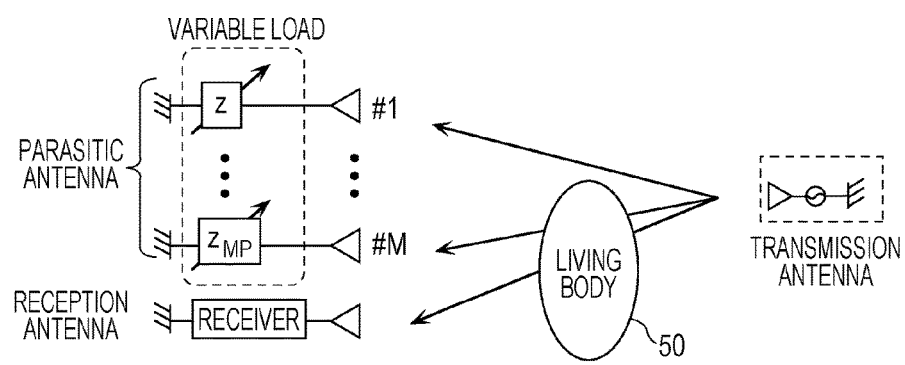
FIG. 7A is a diagram illustrating an antenna model according to the first embodiment.
Figure 7B:
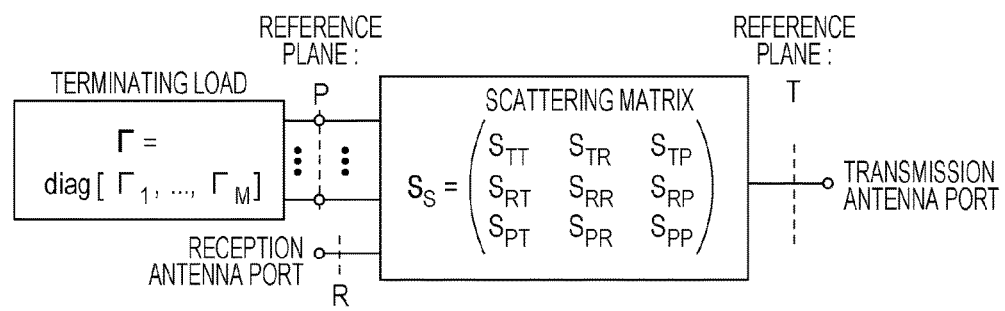
FIG. 7B is a diagram illustrating a circuit model of the antenna model illustrated in FIG. 7A.

FIG. 7A is a diagram illustrating an antenna model according to the first embodiment. FIG. 7B is a diagram illustrating a circuit model of the antenna model illustrated in FIG. 7A. Note that the parasitic antenna in FIG. 7A is constituted by M parasitic antenna elements #1 to #M to which variable loads are respectively connected, and corresponds to the one or more parasitic antennas 111 to which the variable loads 11 are connected in the estimating apparatus 10. The reception antenna in FIG. 7A is constituted by a receiver and a reception antenna element connected to the receiver, which respectively correspond to the receiver 12 and the reception antenna 121 connected to the receiver 12 in the estimating apparatus 10. The transmission antenna in FIG. 7A is constituted by a transmission antenna element to which a transmitter is connected, and corresponds to the transmission antenna 201 to which the transmitter 20 is connected, as illustrated in FIG. 2.

As illustrated in FIG. 7A, some of the radio waves emitted from the transmission antenna element reach the reception antenna element via the living body 50. To the reception antenna element, the receiver is connected by which the reception signal strength is observed. To the M parasitic antenna elements, the variable loads are connected respectively. The parasitic antenna and the reception antenna are collectively called a reception array antenna.

The transmission antenna and the reception array antenna can be regarded as a single circuit system, and a system scattering matrix $S_S$ that includes the transmission antenna, the reception array antenna, and a propagation channel can be defined. FIG. 7B is a diagram illustrating the system as an equivalent circuit. When a reference plane T is defined for the transmission antenna port, a reference plane R is defined for the reception antenna port, and a reference plane P is defined for the parasitic antenna, the scattering matrix of the circuit system is defined by equation 2 below, which is called a system scattering matrix.

$$S_S = \begin{pmatrix} S_{TT} & S_{TR} & S_{TP} \\ S_{RT} & S_{RR} & S_{RP} \\ S_{PT} & S_{PR} & S_{PP} \end{pmatrix} \quad \text{equation 2}$$

Here, X and Y of $S_{XY}$, which is a component of the system scattering matrix $S_S$, are substituted with any of T, R, and P. The component $S_{XY}$ is any of a scalar, a vector, and a matrix and is determined on the basis of the number of antennas. The system scattering matrix $S_S$ is a symmetric matrix, and therefore, $S_{XY}=S_{YX}^T$ (where T means transposition) is satisfied. Therefore, a description is given only on components in the lower triangular matrix among the components of the system scattering matrix $S_S$.

$S_{TT}$ is the reflection coefficient of the transmission antenna, $S_{RR}$ is the reflection coefficient of the fed antenna on the receiving side, and $S_{PP}$ is the scattering matrix of the parasitic antenna. $S_{PR}$ is a vector that represents mutual coupling between the fed antenna element and the parasitic antenna elements on the receiving side. Here, $S_{RR}$, $S_{PP}$, and $S_{PR}$ are known components and are obtained by measuring the S parameters of the antennas in advance. On the other hand, $S_{RT}$ and $S_{PT}$ are unknown components, correspond to a certain complex propagation channel matrix of the reception array antenna that includes the parasitic antenna described above, and can be expressed by equation 3 below.

$$h = \begin{pmatrix} S_{RT} \\ S_{PT} \end{pmatrix} = (S_{TR}, S_{TP})^T \quad \text{equation 3}$$

Next, regarding the system scattering matrix expressed by equation 2, a response in a case where the ports of the parasitic antenna elements terminate is studied. When a termination condition for the M parasitic antenna elements is defined as $Z=[z_1, z_2, \ldots, z_{Mp}]$, a scattering matrix that represents the termination condition can be defined by equation 4 below.

$$\Gamma_k = \text{diag}[\Gamma_{k1}, \ldots, \Gamma_{kM}] \quad \text{equation 4}$$

Here, $\Gamma_{km}$ corresponds to the reflection coefficient of the m-th variable load of the k-th combination and can be expressed by equation 5 below.

$$\Gamma_{km} = (z_{km}-z_0)/(z_{km}+z_0) \quad \text{equation 5}$$

Here, $z_0$ is the reference impedance, and a description is given below while assuming that the internal impedance of the transmitter and the receiver is equal to the reference impedance $z_0$.

In a case where the port of the parasitic antenna satisfies the termination condition defined by equation 4 (in a case where the port of the parasitic antenna terminates), the system scattering matrix $S_S'$ illustrated in FIG. 7B is expressed by equation 6 below:

$$S_S' = \begin{pmatrix} S_{TT}' & S_{TR}' \\ S_{RT}' & S_{RR}' \end{pmatrix} = \begin{pmatrix} S_{TT} + S_{PR}^T \Psi_k S_{PT} & S_{TR} + S_{PT}^T \Psi_k S_{PT} \\ S_{RT} + S_{PR}^T \Psi_k S_{PT} & S_{RR} + S_{PR}^T \Psi_k S_{PT} \end{pmatrix} \quad \text{equation 6}$$

where $\Psi_k = [\Gamma_k^{-1} - S_{PT}]^{-1}$, and $S_{RT} + S_{PR}^T \Psi_k S_{PT}$ represents a complex propagation channel between the transmission antenna (transmission array antenna) and the fed antenna (reception antenna element) of the reception array antenna that can be actually observed.

When a transmission signal from the transmitter is represented by S, the second signal strength (test strength information) observed by the receiver can be predicted (estimated) by using equation 7 below.

$$|y_k^{(I)}| = |S_{RT} + S_{PR}^T \Psi_k S_{PT}| s \quad \text{equation 7}$$

Note that $S_{RT}$ and $S_{PT}$ correspond to a set certain complex propagation channel as described above with reference to equation 3 and can be found in the estimation process described above with reference to FIG. 6B.

As described above, test strength information, that is, the second signal strength of the second signal, can be calculated from the set test complex propagation channel.

Effects and so on

With the estimating apparatus 10 and the estimation method according to this embodiment, the direction in which a moving body is present and so on can be estimated from radio signals received on the receiving side without obtaining phase information regarding the transmitter side.

With the estimating apparatus 10 and the estimation method according to this embodiment, phase measurement is not necessary, and synchronization between the transmitter and the receiver at the phase level is not necessary. Therefore, relatively low-cost transmitters and receives can be used. Further, phase measurement is not necessary because parasitic antennas are used. Therefore, the number of receivers can be decreased.

More specifically, the estimating apparatus 10 according to this embodiment includes one or more parasitic antennas, namely, one or more ESPAR antennas, respectively connected to variable loads and observes a reception signal by a single receiver. The properties of the ESPAR antennas and the surroundings are known. Therefore, by making the load conditions for the ESPAR antennas variable and obtaining the reception strength (RSSI: Received Signal Strength Indicator) by using the receiver, the complex propagation channel can be estimated without obtaining phase information regarding the transmitter side. In other words, when the variable loads (impedance values) of the ESPAR antennas are changed, the reflection coefficient changes and the directivity of the reception antenna imaginarily changes. Therefore, the directivity of the reception antenna is imaginarily changed a plurality of times (a number of times equal to or larger than the number of unknowns of the complex propagation channel), and the reception strength of the reception signal received by the receiver is obtained each time the directivity is changed, from which simultaneous equations can be created. When the simultaneous equations are solved by using the steepest descent method, the complex propagation channel can be estimated.

As described above, the complex propagation channel that reaches the reception antenna connected to the receiver and the parasitic antennas from the transmission antenna external to the estimating apparatus 10 can be estimated only from the reception strength without a need to provide a plurality of receivers. Further, direction estimation can be performed only from the reception strength and observation of phase information is not necessary. Therefore, a simple hardware configuration in which phase information regarding the transmitter side is not obtained, that is, existing low-cost transmitters and receivers, can be used for the estimating apparatus 10 according to this embodiment.

Second Embodiment

Signals received by the estimating apparatus 10 in the first embodiment include a reflection wave obtained by a signal (transmission wave) transmitted from the transmitter 20 being reflected by the living body 50 and a reflection wave that does not come via the living body 50, such as a direct wave and a reflection wave derived from a fixed object. In a second embodiment, a description is given of a method for estimating the direction of the living body 50 that takes into consideration the fact that the signals include a reflection wave that does not come via the living body 50. The description given below omits matters that are the same as in the first embodiment and focuses on matters different from the first embodiment.

Configuration of Estimating Apparatus

An estimating apparatus (not illustrated) according to this embodiment includes a direction estimating unit 26 having a configuration different from that in the estimating apparatus 10 according to the first embodiment.

Direction Estimating Unit 26

Figure 8:
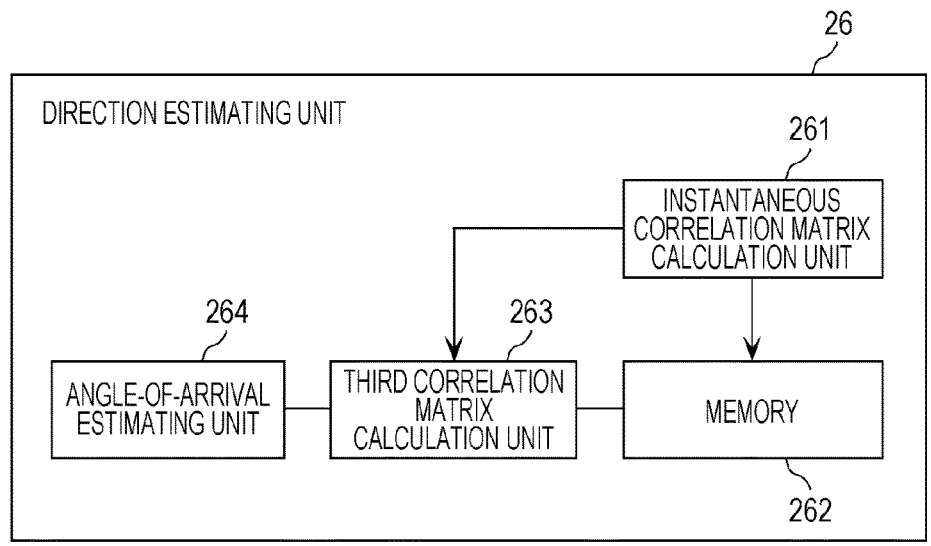
FIG. 8 is a diagram illustrating an example configuration of a direction estimating unit according to a second embodiment.

FIG. 8 is a diagram illustrating an example configuration of the direction estimating unit 26 according to the second embodiment.

The direction estimating unit 26 estimates the direction of arrival of the first signal from complex propagation channels estimated by the complex propagation channel estimating unit 15. In this embodiment, the direction estimating unit 26 includes an instantaneous correlation matrix calculation unit 261, a memory 262, a third correlation matrix calculation unit 263, and an angle-of-arrival estimating unit 264, as illustrated in FIG. 8.

The instantaneous correlation matrix calculation unit 261 calculates a first correlation matrix from a first complex propagation channel estimated by the complex propagation channel estimating unit 15 and stores the first correlation matrix in the memory 262. The instantaneous correlation matrix calculation unit 261 calculates a second correlation matrix from a second complex propagation channel estimated by the complex propagation channel estimating unit 15.

In this embodiment, the complex propagation channel estimating unit 15 estimates the first complex propagation channel as the complex propagation channel in a case where the temporal variation in the first signal strength of the first signal received by the receiver 12 is equal to or smaller than a predetermined value. The complex propagation channel estimating unit 15 estimates the second complex propagation channel as the complex propagation channel in a case where the temporal variation in the first signal strength of the first signal received by the receiver 12 is larger than the predetermined value. Here, in the case where the temporal change in the first signal strength is equal to or smaller than the predetermined value, the first signal does not include a reflection signal obtained by a signal transmitted from the transmission antenna 201 being reflected by the living body 50. The case where the temporal variation in the first signal strength is equal to or smaller than the predetermined value corresponds to a case where the receiver 12 receives the first signal in the person-absent state (in a state where the living body 50 is not present). On the other hand, in the case where the temporal change in the first signal strength is larger than the predetermined value, the first signal includes a reflection signal obtained by a signal transmitted from the transmission antenna 201 being reflected by the living body 50. The case where the temporal variation in the first signal strength is larger than the predetermined value corresponds to a case where the receiver 12 receives the first signal in the person-present state (in a state where the living body 50 is present).

The memory 262 is implemented as a storage device, such as a hard disk drive (HDD) or a non-volatile memory, for example, and stores the first correlation matrix calculated by the instantaneous correlation matrix calculation unit 261.

The third correlation matrix calculation unit 263 calculates a difference matrix obtained by subtracting the first correlation matrix stored in the memory 262 from the second correlation matrix calculated by the instantaneous correlation matrix calculation unit 261 as a third correlation matrix.

The angle-of-arrival estimating unit 264 estimates the angle of arrival of the first signal from the third correlation matrix calculated by the third correlation matrix calculation unit 263.

Operations Performed by Estimating Apparatus

Figure 9:
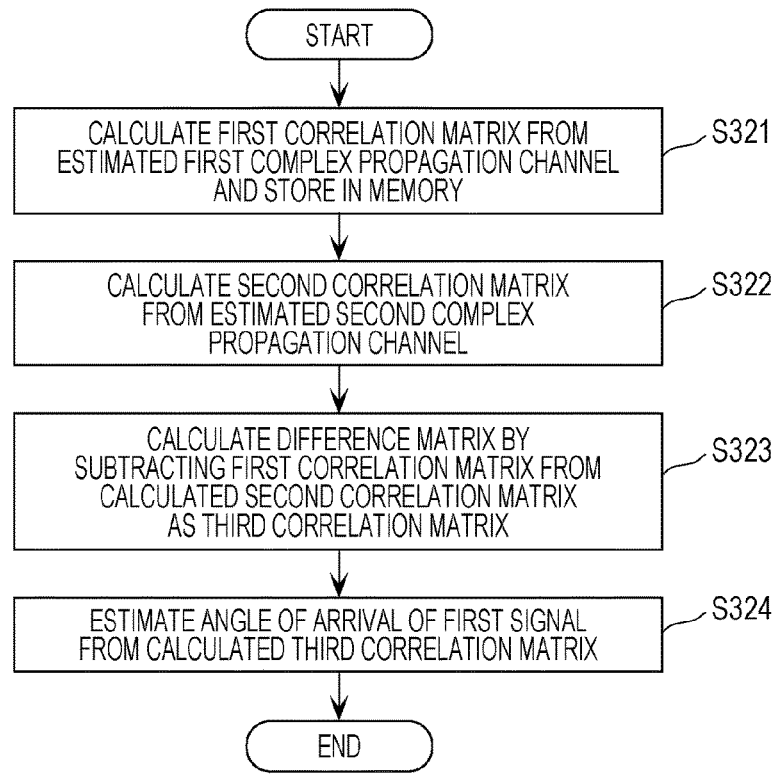
FIG. 9 is a flowchart of a direction estimation process performed by the direction estimating unit according to the second embodiment.
Figure 10:
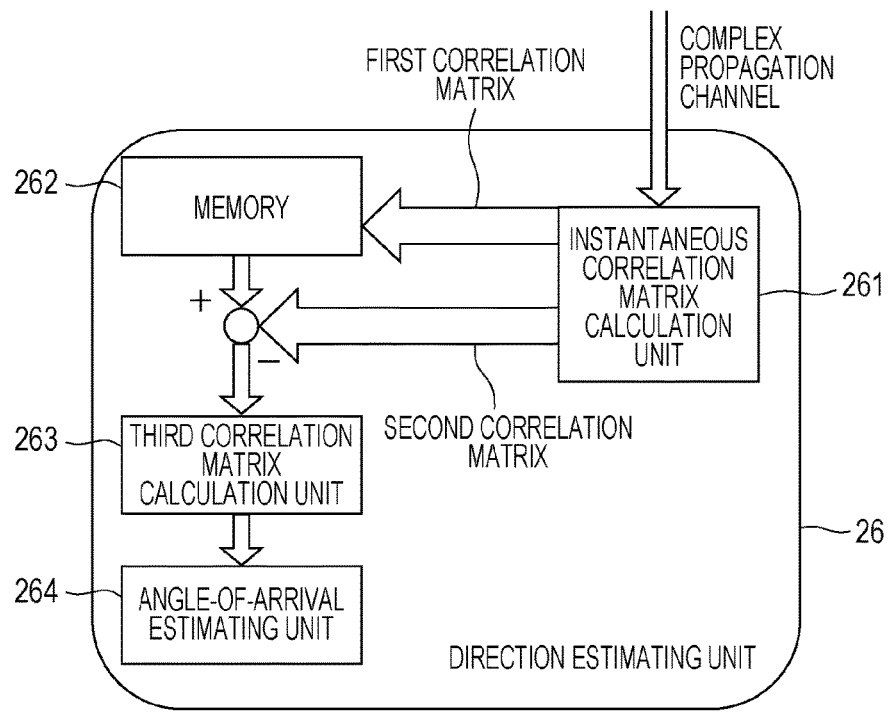
FIG. 10 is a diagram illustrating a flow of the direction estimation process performed by the direction estimating unit according to the second embodiment.

A description is given of operations in a direction estimation process performed by the estimating apparatus 10 according to the second embodiment that is configured as described above. FIG. 9 is a flowchart of a direction estimation process performed by the direction estimating unit 26 according to the second embodiment. FIG. 10 is a diagram illustrating a flow of the direction estimation process performed by the direction estimating unit 26 according to the second embodiment.

First, the complex propagation channel estimating unit 15 estimates a first complex propagation channel in a state where it is known that no one is present (in the person-absent state) before estimation of the direction of the living body

50. The direction estimating unit 26 calculates a first correlation matrix from the first complex propagation channel estimated by the complex propagation channel estimating unit 15 and stores the first correlation matrix in the memory 262 (step S321).

More specifically, the instantaneous correlation matrix calculation unit 261 calculates an instantaneous correlation matrix $R_{01}$ from a first complex propagation channel h in the person-absent state estimated by the complex propagation channel estimating unit 15 as expressed by equation 8 below:

$$R_{01} = hh^H \qquad \text{equation 8}$$

where $\{\bullet\}^H$ represents complex conjugate transposition.

Subsequently, the instantaneous correlation matrix calculation unit 261 calculates a matrix obtained by calculating the instantaneous correlation matrix expressed by equation 8 L times and averaging the calculated matrices, as expressed by equation 9, and defines the matrix as a first correlation matrix $R_1$.

$$R_1 = \frac{1}{L}\sum_{l=1}^{L} R_{01}^{(l)} \qquad \text{equation 9}$$

Next, the complex propagation channel estimating unit 15 estimates a second complex propagation channel in a state where it is known that someone is present (in the person-present state). The direction estimating unit 26 calculates a second correlation matrix from the second complex propagation channel estimated by the complex propagation channel estimating unit 15 (step S322).

More specifically, the instantaneous correlation matrix calculation unit 261 calculates an instantaneous correlation matrix $R_{02}$ from a second complex propagation channel h in the person-present state estimated by the complex propagation channel estimating unit 15 as expressed by equation 10 below in a similar manner.

$$R_{02} = hh^H \qquad \text{equation 10}$$

Subsequently, the instantaneous correlation matrix calculation unit 261 calculates a matrix obtained by calculating the instantaneous correlation matrix expressed by equation 10 L times and averaging the calculated matrices, as expressed by equation 11, and defines the matrix as a second correlation matrix $R_2$.

$$R_2 = \frac{1}{L}\sum_{l=1}^{L} R_{02}^{(l)} \qquad \text{equation 11}$$

Next, the direction estimating unit 26 calculates a difference matrix by subtracting the first correlation matrix stored in the memory 262 from the second correlation matrix calculated in step S322 as a third correlation matrix (step S323).

More specifically, the third correlation matrix calculation unit 263 subtracts the first correlation matrix $R_1$ expressed by equation 9 from the second correlation matrix $R_2$ expressed by equation 11 and obtains a third correlation matrix $R_3$ ($R_3 = R_2 - R_1$).

Next, the direction estimating unit 26 estimates the direction of arrival of the first signal from the calculated third correlation matrix (step S324).

Here, the first correlation matrix $R_1$ is a matrix calculated from the first complex propagation channel estimated in the person-absent state, as described above, and corresponds to complex propagation channel components, such as a direct wave and a reflection wave from a wall, for example, other than those derived from the living body 50. On the other hand, the second correlation matrix $R_2$ is a matrix calculated from the complex propagation channel observed in the person-present state and is formed of a combination of components derived from the living body 50 and fixed components not derived from the living body 50.

Therefore, by subtracting the first correlation matrix $R_1$ from the second correlation matrix $R_2$, only components derived from the living body 50 remain ideally. That is, the angle-of-arrival estimating unit 264 is capable of estimating the angle of arrival of the first signal, that is, the direction of the living body 50, in a multiple-wave environment, such as an indoor environment, by using the third correlation matrix $R_3$.

Effects and so on

With the estimating apparatus and the estimation method according to this embodiment, the direction in which a moving body is present and so on can be estimated from radio signals received on the receiving side without obtaining phase information regarding the transmitter side even in a multiple-wave environment, such as an indoor environment.

Third Embodiment

The method for estimating the direction of the living body 50 by removing complex propagation channel components, such as a direct wave and a reflection wave from a wall, for example, other than those derived from the living body 50 is described in the second embodiment; however, the method for estimating the direction of the living body 50 is not limited to this method. In a third embodiment, a description is given of the method for estimating the direction of the living body 50 by removing complex propagation channel components other than those derived from the living body 50 with a method different from the second embodiment. The description given below omits matters that are the same as in the first embodiment and focuses on matters different from the first embodiment.

Configuration of Estimating Apparatus

An estimating apparatus (not illustrated) according to this embodiment includes a direction estimating unit 36 having a configuration different from that in the estimating apparatus 10 according to the first embodiment.

Direction Estimating Unit 36

Figure 11:
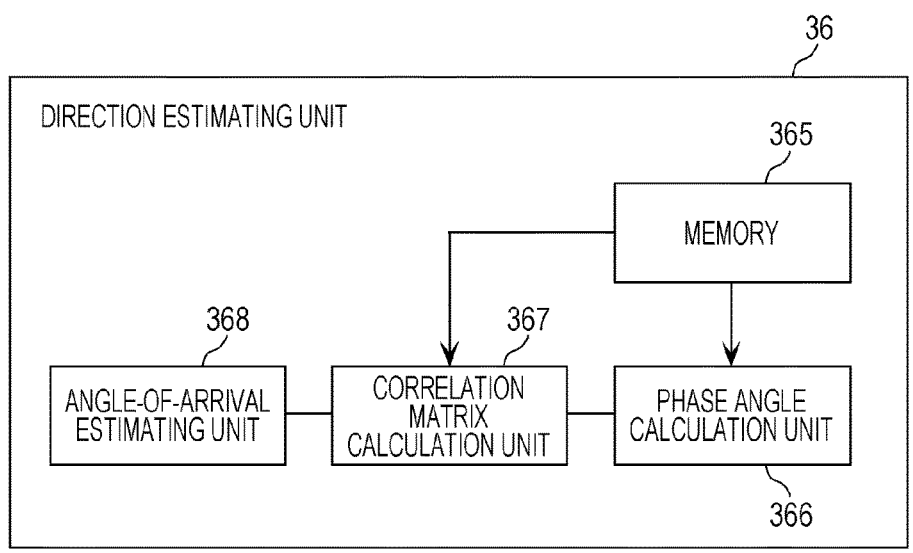
FIG. 11 is a diagram illustrating an example configuration of a direction estimating unit according to a third embodiment.

FIG. 11 is a diagram illustrating an example configuration of the direction estimating unit 36 according to the third embodiment.

The direction estimating unit 36 estimates the direction of arrival of the first signal from complex propagation channels estimated by the complex propagation channel estimating unit 15. In this embodiment, the direction estimating unit 36 includes a memory 365, a phase angle calculation unit 366, a correlation matrix calculation unit 367, and an angle-of-arrival estimating unit 368, as illustrated in FIG. 11.

The memory 365 is implemented as a storage device, such as an HDD or a non-volatile memory, for example, and stores a first complex propagation channel estimated by the complex propagation channel estimating unit 15. In this embodiment, the memory 365 stores the first complex propagation channel that is estimated by the complex propagation channel estimating unit 15 as the complex propagation channel at a predetermined time.

The phase angle calculation unit 366 compares the first complex propagation channel stored in the memory 365 with a second complex propagation channel estimated by the complex propagation channel estimating unit 15 to obtain the phase difference. Here, the second complex propagation channel is a channel estimated by the complex propagation channel estimating unit 15 as the complex propagation channel at a time after the predetermined time.

Subsequently, the phase angle calculation unit 366 searches for a phase rotation (phase angle) with which the average of the phase difference is minimized, and calculates a third complex propagation channel, which is a difference obtained by subtracting the first complex propagation channel from the second complex propagation channel to which the found phase rotation (phase angle) is applied.

The correlation matrix calculation unit 367 calculates a correlation matrix from the third complex propagation channel calculated by the phase angle calculation unit 366.

The angle-of-arrival estimating unit 368 estimates the angle of arrival of the first signal from the correlation matrix calculated by the correlation matrix calculation unit 367.

Operations Performed by Estimating Apparatus

Figure 12:
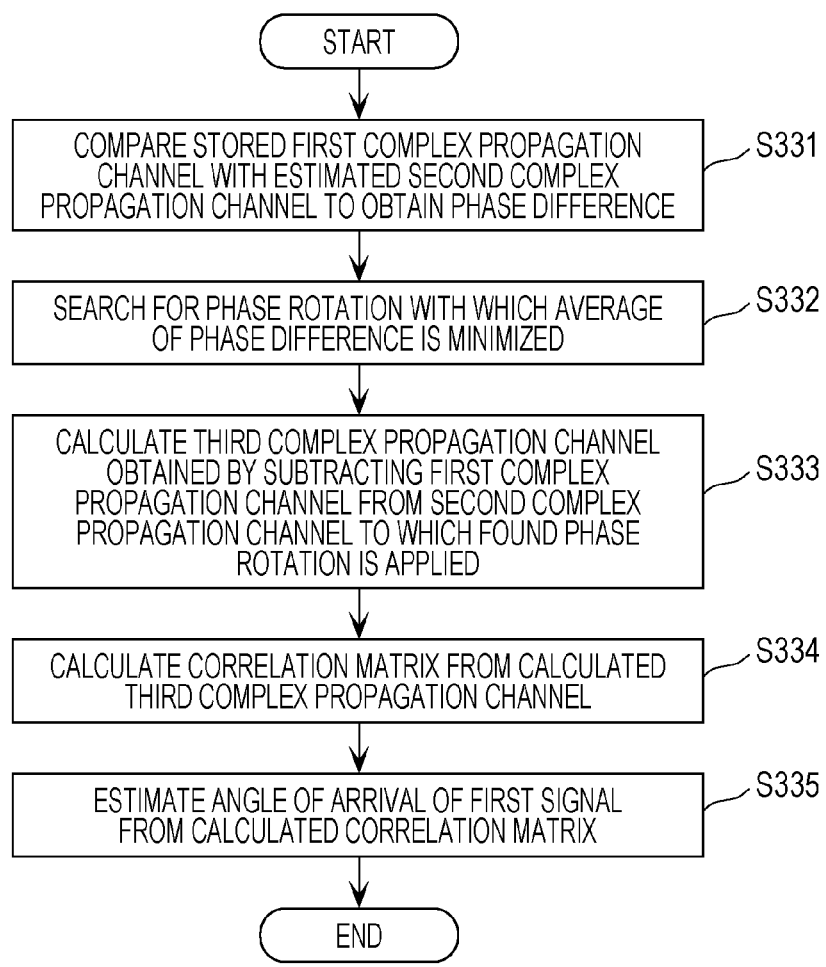
FIG. 12 is a flowchart of a direction estimation process performed by the direction estimating unit according to the third embodiment.
Figure 13:
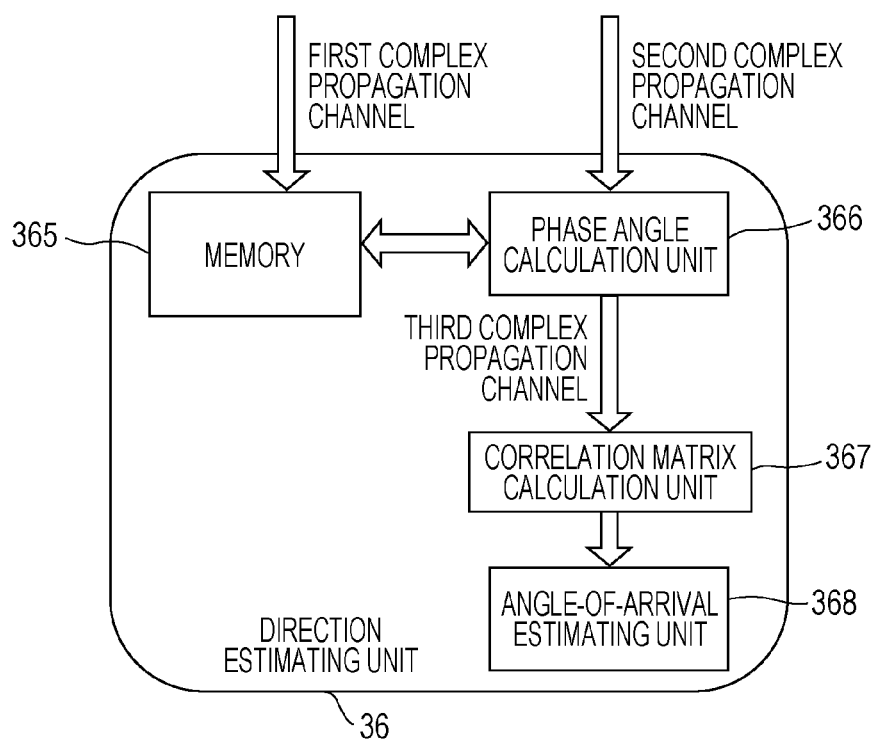
FIG. 13 is a diagram illustrating a flow of the direction estimation process performed by the direction estimating unit according to the third embodiment.

A description is given of operations in a direction estimation process performed by the estimating apparatus 10 according to the third embodiment that is configured as described above. FIG. 12 is a flowchart of a direction estimation process performed by the direction estimating unit 36 according to the third embodiment. FIG. 13 is a diagram illustrating a flow of the direction estimation process performed by the direction estimating unit 36 according to the third embodiment.

First, the complex propagation channel estimating unit 15 stores a complex propagation channel estimated at a certain time point (predetermined time) in the memory 365 as a first complex propagation channel $h^{(1)}$. Here, a complex propagation channel estimated thereafter (at a time after the predetermined time) is regarded as a second complex propagation channel $h^{(I)}$, where I represents a measurement number that corresponds to the observation time (estimation time).

Next, the direction estimating unit 36 compares the first complex propagation channel stored in the memory 365 with the second complex propagation channel estimated at the time after the predetermined time to obtain the phase difference (step S331) and searches for a phase rotation (phase angle) with which the average of the phase difference is minimized (step S332).

More specifically, in a typical multiple-wave environment, it is assumed that direct waves and reflection waves that come via walls have a signal strength much higher than the signal strength of signals that come via a living body. Therefore, it can be assumed that the phase of any complex propagation channel element does not significantly vary. Meanwhile, it is assumed that a random phase is applied to the first complex propagation channel and to the second complex propagation channel estimated by the estimating apparatus 10 in the third embodiment. This is because the estimating apparatus 10 estimates the first complex propagation channel and the second complex propagation channel only from strength information. It is not possible to estimate the absolute phases of the channels.

Accordingly, supposing that fixed components, which are main components of the first complex propagation channel $h^{(1)}$ and the second complex propagation channel $h^{(I)}$, do not change, the phase angle calculation unit 366 searches for and determines a correction phase $\theta_I$ with which $\Delta p^{(I)}$ expressed by equation 12 below is minimized.

$$\Delta p^{(I)} = |h^{(I)} e^{-j\theta_I} - h^{(I)}| \qquad \text{equation 12}$$

Next, the direction estimating unit 36 calculates a third complex propagation channel obtained by subtracting the first complex propagation channel from the second complex propagation channel to which the phase rotation (phase angle) found in step S332 is applied (step S333).

More specifically, the phase angle calculation unit 366 calculates a difference channel as expressed by equation 13 below by using the correction phase $\theta_I$ found by using equation 12. This difference channel is called a third complex propagation channel $\Delta h^{(I)}$.

$$\Delta h^{(I)} = h^{(I)} e^{-j\theta_I} - h^{(I)} \qquad \text{equation 13}$$

Next, the direction estimating unit 36 calculates a correlation matrix from the third complex propagation channel calculated in step S333 (step S334).

More specifically, the correlation matrix calculation unit 367 calculates a correlation matrix R as expressed by equation 14 below from the third complex propagation channel $\Delta h^{(I)}$ expressed by equation 13.

$$R = \frac{1}{L} \sum_{i=1}^{L} \Delta h^{(i)} \Delta h^{(i)H} \qquad \text{equation 14}$$

Here, the difference channel (third complex propagation channel) is obtained in the subtraction process using equation 13, as described above, and therefore, components that are always fixed are removed from the correlation matrix R expressed by equation 14, and only components derived from the living body 50 remain. Then, the direction estimating unit 36 estimates the direction of arrival of the first signal from the calculated correlation matrix (step S335).

Accordingly, various direction estimation processes can be applied when the correlation matrix R expressed by equation 14 is determined. With the direction estimation method described above, it is not necessary to separately estimate the first complex propagation channel in the person-absent state, and the direction of the living body 50 can be estimated even in a case where the propagation environment changes, such as in a case where furniture is moved, for example.

Effects and so on

With the estimating apparatus and the estimation method according to this embodiment, the direction in which a moving body is present and so on can be estimated from radio signals received on the receiving side without obtaining phase information regarding the transmitter side even in a case where the propagation environment changes in a multiple-wave environment, such as an indoor environment.

Fourth Embodiment

In the first to third embodiments, the descriptions are given of the case where the direction of the living body 50 is estimated by estimating the complex propagation channel from the first signal strength of the first signal received by the receiver 12; however, the estimation is not limited to this case. The direction of the living body 50 may be estimated by estimating the complex propagation channel from a signal strength obtained by optimizing the first signal strength of the first signal received by the receiver 12. A description of this case is given below as a fourth embodiment while omitting matters that are the same as in the first embodiment and focusing on matters different from the first embodiment.

Configuration of Estimating Apparatus

An estimating apparatus (not illustrated) according to this embodiment includes a strength information recording unit 44, a complex propagation channel estimating unit 45, and a direction estimating unit 46 each having a configuration different from that in the estimating apparatus 10 according to the first and other embodiments. Note that the variable load controller 13 in the estimating apparatus 10 controls the impedance values of the variable loads 11 as described above. A description is given below while assuming that the variable load controller 13 controls K (where K is an integer equal to or larger than two) different combinations of the impedance values of the variable loads 11 of the one or more parasitic antennas 111.

Strength Information Recording Unit 44

Figure 14:
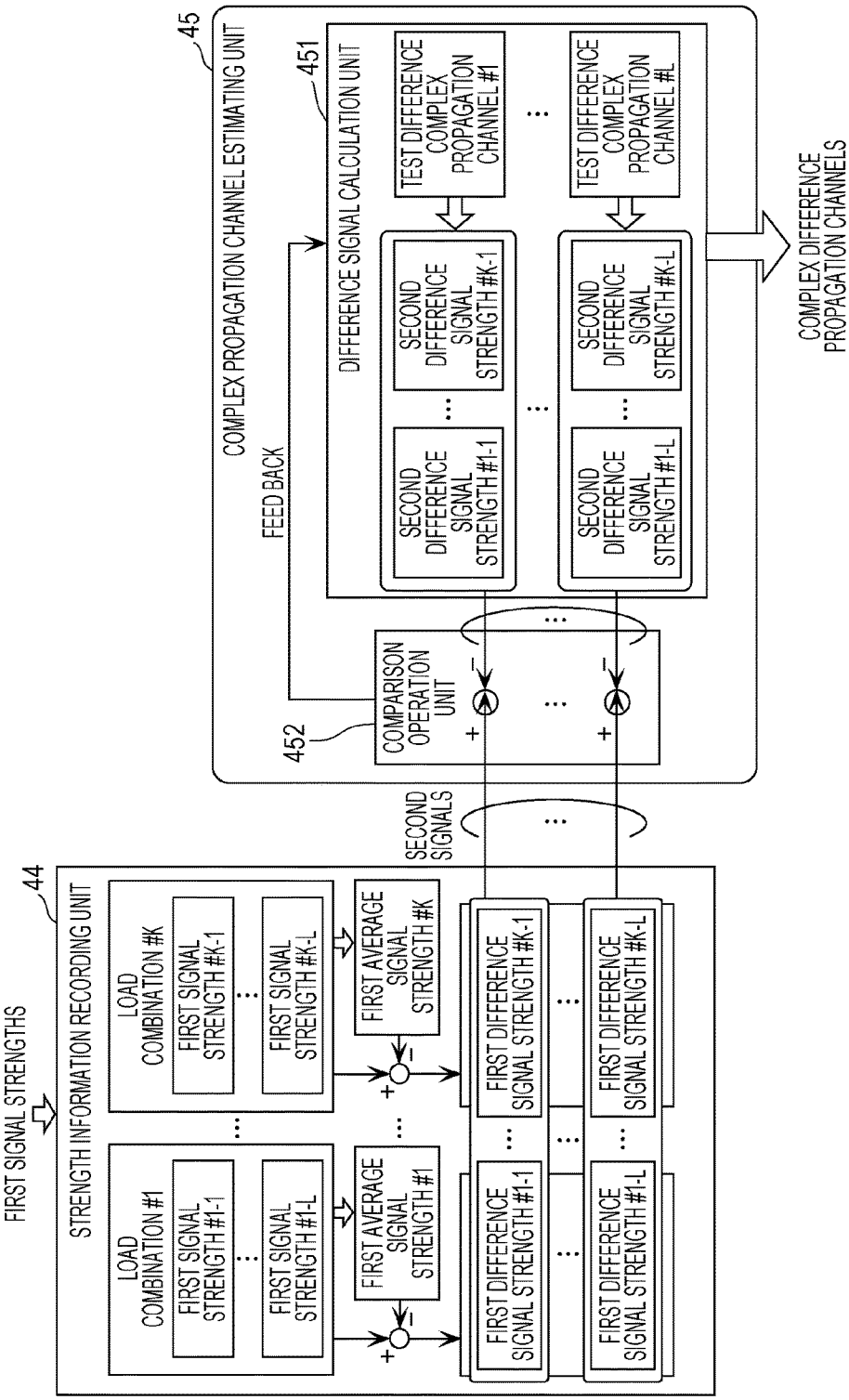
FIG. 14 is a diagram illustrating an example configuration of a strength information recording unit and a complex propagation channel estimating unit according to a fourth embodiment.

FIG. 14 is a diagram illustrating an example configuration of the strength information recording unit 44 and the complex propagation channel estimating unit 45 according to the fourth embodiment.

The strength information recording unit 44 accumulates the first signal strength of the first signal received by the receiver 12 L times (where L is an integer equal to or larger than two) for each of the K different combinations of the impedance values of the variable loads 11 and calculates a first average signal strength, which is the average of the first signal strength accumulated L times, for each of the K different combinations. The strength information recording unit 44 calculates and accumulates K×L first difference signal strengths obtained by subtracting, from each of the accumulated first signal strengths, which are the L first signal strengths for each of the K different combinations, a corresponding one of the first average signal strengths.

In this embodiment, as illustrated in FIG. 14, the strength information recording unit 44 records strength information (first signal strength) regarding the first signal for each of the K different combinations of the impedance values (loads in the figure) of the variable loads 11 and observes the strength information L times. That is, the strength information recording unit 44 records K×L pieces of strength information (first signal strengths) regarding the first signal.

Here, a description is given while focusing on the first combination of loads. The estimating apparatus according to this embodiment performs observation L times, and therefore, the strength information recording unit 44 accumulates L pieces of strength information (first signal strength #1-1 to first signal strength #1-L) regarding a first signal #1-1 to a first signal #1-L in total. Then, the strength information recording unit 44 calculates a first average signal strength #1, which is the average of the L pieces of strength information (first signal strengths), and subtracts the first average signal strength #1 from each of the first signal strength #1-1 to the first signal strength #1-L that have been accumulated. As a result, a first difference signal strength #1-1 to a first difference signal strength #1-L are obtained.

The strength information recording unit 44 performs a similar process for all of the K different combinations of loads.

As described above, the strength information recording unit 44 accumulates K×L first signal strengths of first signals received by the receiver 12 and accumulates K×L first difference signal strengths that are obtained by optimizing the first signal strengths.

Complex Propagation Channel Estimating Unit 45

The complex propagation channel estimating unit 45 includes a difference signal calculation unit 451 and a comparison operation unit 452, as illustrated in FIG. 14.

The difference signal calculation unit 451 sets L test difference complex propagation channels respectively having predetermined values and calculates K second difference signal strengths for each of the L test difference complex propagation channels that have been set.

The comparison operation unit 452 cooperates with the difference signal calculation units 451 and searches for a value of each of the test difference complex propagation channels with which differences between the corresponding K first difference signal strengths accumulated by the strength information recording unit 44 and the calculated second difference signal strengths are minimized. Then, the comparison operation unit 452 estimates the L test difference complex propagation channels having the found values as L complex difference propagation channels at the time when the receiver 12 receives the first signals.

In this embodiment, the difference signal calculation unit 451 first sets a test difference complex propagation channel (#1) that corresponds to the first observation to a certain value. Then, the difference signal calculation unit 451 assumes that the test difference complex propagation channel (#1) is correct, and calculates a test difference signal strength #1-1 to a test difference signal strength #K–1 (K strengths in total) that respectively correspond to the combinations of loads by using equation 7. Here, each of the test difference signal strengths is strength information regarding a signal supposed to be received by the receiver 12 for a corresponding one of the combinations of loads, and the test difference signal strengths correspond to the second difference signal strengths described above.

Subsequently, the comparison operation unit 452 subtracts the K test difference signal strengths (second difference signal strengths) calculated by the difference signal calculation unit 451 from the corresponding K first difference signal strengths calculated by the strength information recording unit 44 respectively for comparison. Here, the subtraction is performed for each set of a first difference signal strength and a second difference signal strength that correspond to the same combination of loads. As a result, K difference values are obtained. The comparison operation unit 452 evaluates the obtained K difference values by using an evaluation function of totaling the absolute values of the K difference values, for example, and feeds the evaluation result back to the difference signal calculation unit 451.

The difference signal calculation unit 451 resets the test difference complex propagation channel (#1) on the basis of the fed-back result and calculates K test difference signal strengths (second difference signal strengths) on the basis of the reset channel. Then, the comparison operation unit 452 performs again the comparison operation described above.

The complex propagation channel estimating unit 45 repeats the above-described procedure a number of times so that the comparison operation result is minimized to thereby estimate the complex difference propagation channel. The steepest descent method, for example, can be used to estimate the complex difference propagation channel. The complex propagation channel estimating unit 45 performs such a process L times to estimate L chronological complex difference propagation channels.

Direction Estimating Unit 46

Figure 15:
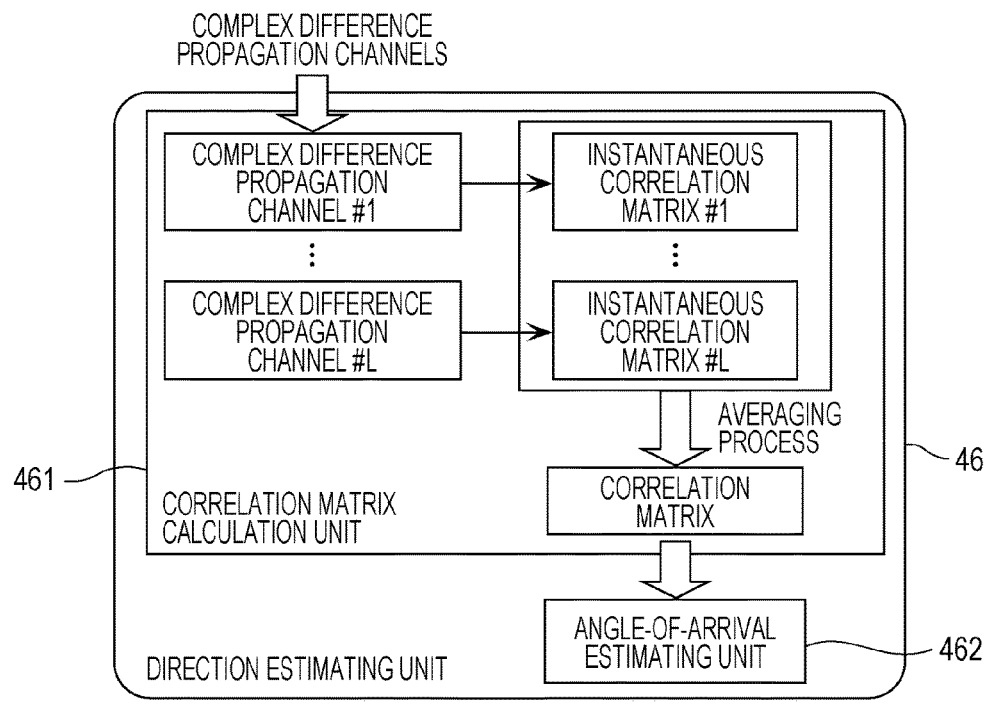
FIG. 15 is a diagram illustrating an example configuration of a direction estimating unit according to the fourth embodiment.

FIG. 15 is a diagram illustrating an example configuration of the direction estimating unit 46 according to the fourth embodiment.

The direction estimating unit 46 includes a correlation matrix calculation unit 461 and an angle-of-arrival estimating unit 462 and estimates the direction of arrival of the first signal from the complex difference propagation channels estimated by the complex propagation channel estimating unit 45. The correlation matrix calculation unit 461 calculates a correlation matrix from the L complex difference propagation channels estimated by the complex propagation channel estimating unit 45. The angle-of-arrival estimating unit 462 estimates the direction of arrival of the first signal by estimating the angle of arrival of the first signal from the correlation matrix calculated by the correlation matrix calculation unit 461.

In this embodiment, the correlation matrix calculation unit 461 converts the complex difference propagation channels estimated by the complex propagation channel estimating unit 45 into instantaneous correlation matrices respectively. The correlation matrix calculation unit 461 averages the L converted instantaneous correlation matrices in total for each element to thereby calculate a correlation matrix. The angle-of-arrival estimating unit 462 estimates the angle of arrival of the first signal from the correlation matrix calculated by the correlation matrix calculation unit 461. The angle of arrival of the first signal corresponds to the direction of the living body 50, which is a detection target, as described above.

Operations Performed by Estimating Apparatus

A description is given of operations respectively performed by the strength information recording unit 44, the complex propagation channel estimating unit 45, and the direction estimating unit 46 that are configured as described above.

Figure 16:
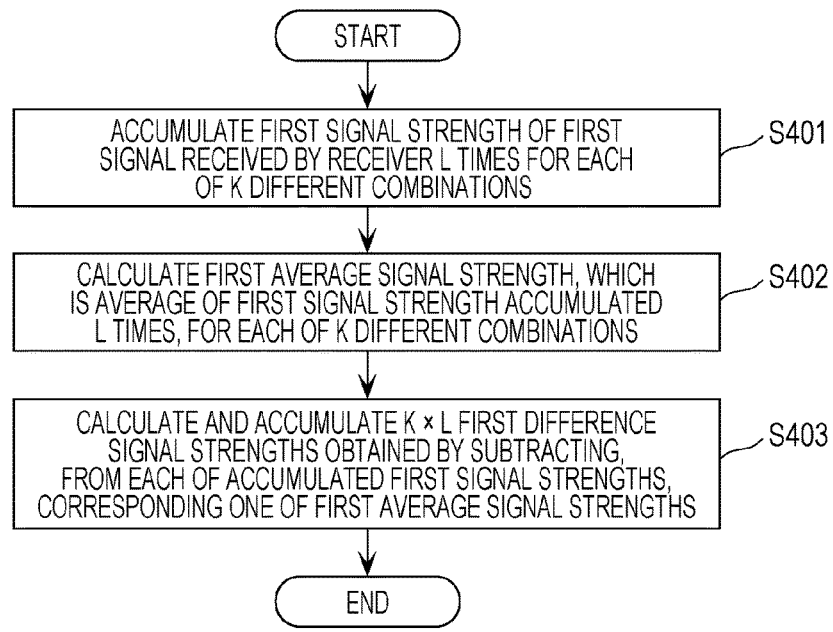
FIG. 16 is a flowchart of an estimation process performed by the strength information recording unit according to the fourth embodiment.

FIG. 16 is a flowchart of an estimation process performed by the strength information recording unit 44 according to the fourth embodiment.

First, the strength information recording unit 44 accumulates the first signal strength of the first signal received by the receiver 12 L times (where L is an integer equal to or larger than two) for each of the K different combinations of the impedance values of the variable loads 11 (step S401).

Next, the strength information recording unit 44 calculates a first average signal strength, which is the average of the first signal strength accumulated L times, for each of the K different combinations (step S402).

Next, the strength information recording unit 44 calculates and accumulates K×L first difference signal strengths obtained by subtracting, from each of the accumulated first signal strengths, which are the L first signal strengths for each of the K different combinations, a corresponding one of the first average signal strengths (step S403).

Figure 17:
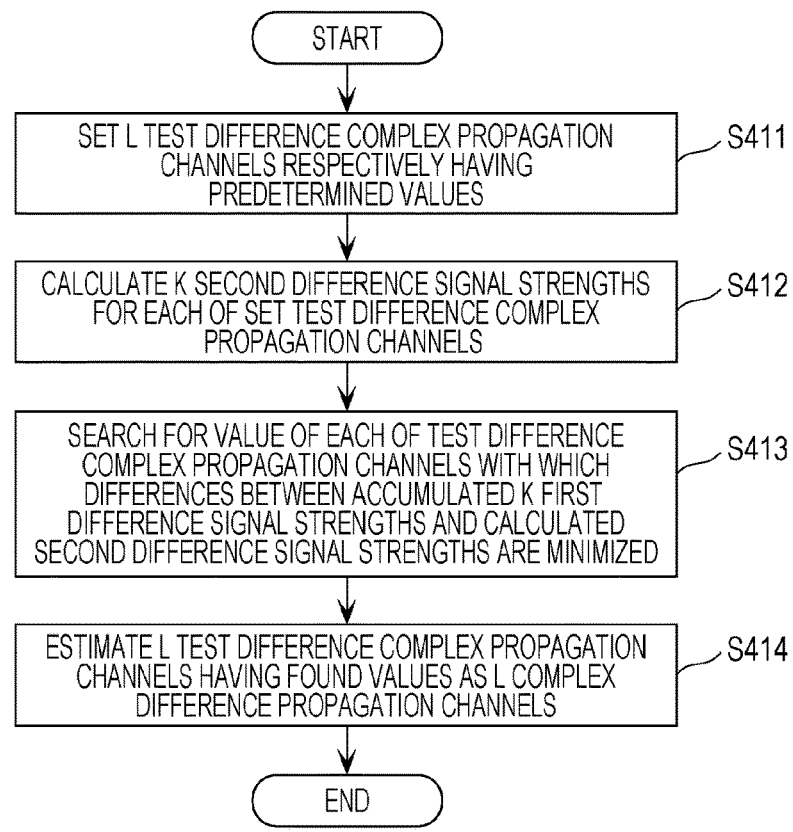
FIG. 17 is a flowchart of an estimation process performed by the complex propagation channel estimating unit according to the fourth embodiment.

FIG. 17 is a flowchart of an estimation process performed by the complex propagation channel estimating unit 45 according to the fourth embodiment.

First, the complex propagation channel estimating unit 45 sets L test difference complex propagation channels respectively having predetermined values (step S411).

Next, the complex propagation channel estimating unit 45 calculates K second difference signal strengths for each of the L test difference complex propagation channels that have been set (step S412).

Next, the complex propagation channel estimating unit 45 searches for a value of each of the test difference complex propagation channels with which differences between the corresponding K first difference signal strengths accumulated by the strength information recording unit 44 and the calculated second difference signal strengths are minimized (step S413).

Then, the complex propagation channel estimating unit 45 estimates the L test difference complex propagation channels having the found values as L complex difference propagation channels at the time when the receiver 12 receives the first signals (step S414).

Figure 18:
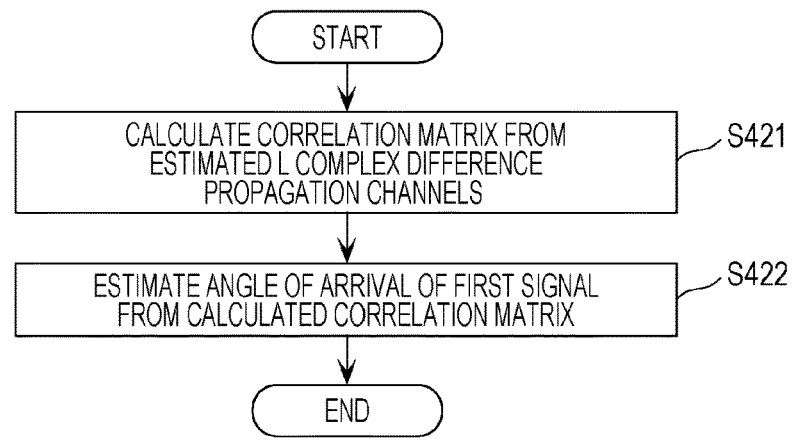
FIG. 18 is a flowchart of an estimation process performed by the direction estimating unit according to the fourth embodiment.

FIG. 18 is a flowchart of an estimation process performed by the direction estimating unit 46 according to the fourth embodiment.

First, the direction estimating unit 46 calculates a correlation matrix from the L complex difference propagation channels estimated by the complex propagation channel estimating unit 45 (step S421).

Next, the direction estimating unit 46 estimates the direction of arrival of the first signal by estimating the angle of arrival of the first signal from the correlation matrix calculated in step S421 (step S422).

Effects and so on

With the estimating apparatus and the estimation method according to this embodiment, the direction in which a moving body is present and so on can be estimated from radio signals received on the receiving side without obtaining phase information regarding the transmitter side even in a multiple-wave environment, such as an indoor environment.

More specifically, the estimating apparatus according to this embodiment includes one or more parasitic antennas, namely, one or more ESPAR antennas, respectively connected to variable loads and observes a reception signal by a single receiver. The properties of the ESPAR antennas and the surroundings are known. Therefore, by changing the load conditions for the ESPAR antennas to K different combinations and obtaining the reception strengths (RSSIs) by using the receiver, the complex difference propagation channels can be estimated by using the steepest descent method, for example, without obtaining phase information regarding the transmitter side. That is, when the variable loads (impedance values) of the ESPAR antennas are changed, the reflection coefficient changes and the directivity of the reception antenna imaginarily changes. Therefore, the directivity of the reception antenna is imaginarily changed a plurality of times (a number of times equal to or larger than the number of unknowns of the complex propagation channel), and the reception strength of the reception signal received by the receiver is obtained each time the directivity is changed, from which simultaneous equations can be created. When the simultaneous equations are solved by using the steepest descent method, the complex difference propagation channels can be estimated.

An evaluation is made to confirm the effects of the fourth embodiment by conducting an experiment, which will be described below.

Figure 19:
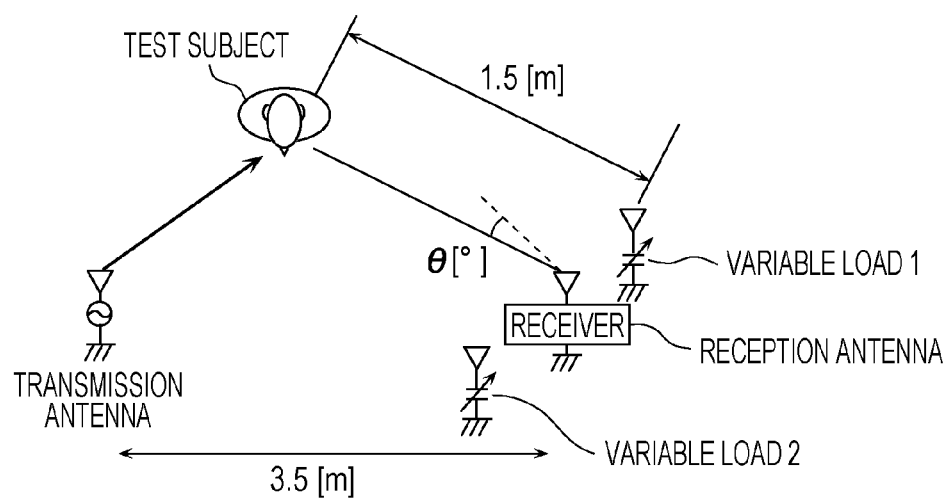
FIG. 19 is a diagram illustrating the general idea of an experiment using a direction estimation method according to the fourth embodiment.

FIG. 19 is a diagram illustrating the general idea of the experiment using the direction estimation method according to the fourth embodiment.

The antenna configuration in the experiment system illustrated in FIG. 19 is such that a single-element rectangular patch antenna operating in the 2.47 GHz band is used as the transmission antenna and that a three-element patch array antenna constituted by a single-element rectangular patch antenna and a two-element parasitic antenna is used as the reception antenna. The height at which the transmission antenna and the reception antenna are positioned is set to 1.05 m, which corresponds to the height at which the abdominal region of a test subject (living body) is positioned. The distance between the transmission antenna and the reception antenna is set to 3.5 m, and the distance between the reception antenna and the test subject is set to 1.5 m. The test subject stands upright and remains stationary at the position of −20° relative to the antenna front, which serves as the reference. The observation time is 12.8 seconds, the number of combinations of values of the variable loads, which is represented by K, is set to 16, and the number of observations, which is represented by L, is set to 128.

Figure 20:
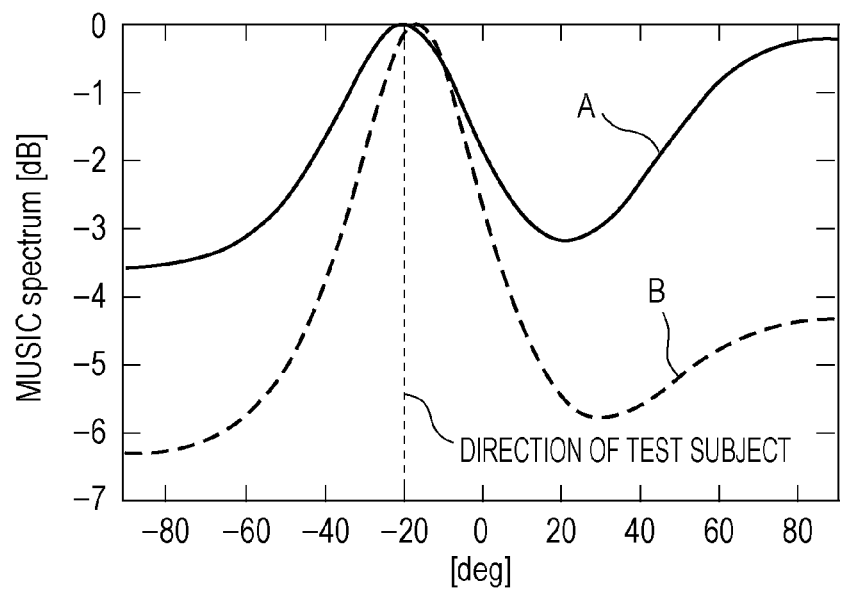
FIG. 20 is a diagram illustrating the result of the experiment using the estimation method according to the fourth embodiment.

FIG. 20 is a diagram illustrating the result of the experiment using the estimation method according to the fourth embodiment. FIG. 20 illustrates the result obtained by using the MUltiple Signal Classification (MUSIC) method in the direction estimation process. In FIG. 20, the horizontal axis represents the angle relative to the antenna front, which serves as the reference, and the vertical axis represents the MUSIC spectrum strength. The maximum value of the MUSIC spectrum corresponds to the direction of arrival. The solid line A represents the result of the experiment using the estimation method according to the fourth embodiment. As a comparative example, the broken line B represents the result of an experiment using an estimation method according to the related art. Here, an estimation method according to the related art is a method in which phase information regarding the transmitter side is obtained. The experiment result represented by the broken line B is obtained by observing all complex propagation channels by using a three-element rectangular patch array antenna, removing fixed reflection components from observation data for 12.8 seconds, and thereafter estimating the direction.

It is found from the results illustrated in FIG. 20 that the direction of a living body can be estimated with high accuracy by using the estimation method according to the fourth embodiment. The angle error is 0.7°.

As described above, it is confirmed that the direction of a living body can be estimated with an accuracy comparable to that achieved by using a method according to the related art.

The direction estimation method and direction estimating apparatus according to an aspect of the present disclosure has been described with reference to embodiments; however, the present disclosure is not limited to the embodiments, and various modifications to any of the embodiments conceived by a person skilled in the art and a mode configured by combining constituent elements in different embodiments also fall within the scope of the present disclosure without departing from the spirit of the present disclosure.

For example, in the first to fourth embodiments, the example case where the direction of the living body 50 is estimated is described; however, the target is not limited to the living body 50. The present disclosure is also applicable to various moving bodies (machines and so on) that, when irradiated with a high-frequency signal, exert the Doppler effect on the reflection waves caused by their activities.

Further, a position estimating apparatus that includes two or more of the estimating apparatuses according to any of the first to fourth embodiments disposed at different places may be used to estimate the position of a moving body on the basis of the direction of arrival of the first signal estimated by each of the two or more estimating apparatuses, for example. More specifically, in a position estimation method for a position estimating apparatus that includes two or more of the estimating apparatuses according to any of the first to fourth embodiments disposed at different places, the first signal may include a reflection signal obtained by a signal transmitted from a transmission antenna being reflected by a moving body, and the position of the moving body may be estimated on the basis of the direction of arrival of the first signal estimated by each of the two or more estimating apparatuses. The position at which the directions of arrival of the first signal respectively estimated by the two or more estimating apparatuses intersect can be estimated to be the position of the moving body.

The present disclosure can be implemented not only as an estimating apparatus including the above-described characteristic constituent elements but also as an estimation method that includes the characteristic constituent elements included in the estimating apparatus as steps. Further, the characteristic steps included in the method can be implemented as a computer program that is executed by a computer. The computer program can be distributed via a non-transitory computer-readable recording medium, such as a CD-ROM, or via a communication network, such as the Internet, as a matter of course.

The present disclosure can be used in a direction estimation method, a position estimation method, and a direction estimating apparatus for estimating the direction and position of a moving body by using radio signals. Specifically, the present disclosure can be used in a direction estimation method, a position estimation method, and a direction estimating apparatus installed on measurement devices for measuring the direction and position of a moving body, such as a living body and a machine, home electrical appliances that perform control in accordance with the direction and position of a moving body, and monitoring devices for detecting an intruding moving body.

What is claimed is:
1. A position sensor comprising:
   at least one reception antenna;
   at least one parasitic antenna terminating in a variable load;
   a controller that sets an impedance value of the variable load;
   a transmitter that transmits a transmission signal to a predetermined area in search of an organic body;
   a receiver that receives a first signal, the first signal being formed of a combination of a signal received by the reception antenna and a signal received by the parasitic antenna, the signal received by the reception antenna and the signal received by the parasitic antenna being derived from the transmission signal, and the signal received by the parasitic antenna corresponding to the set impedance value of the variable load;
   a memory that stores, when the impedance value of the variable load is set by the controller, a first signal strength value that indicates a strength of the first signal corresponding to the set impedance value of the variable load; and
   a processor that
      sets a plurality of complex propagation channel candidates indicating signal propagation properties between the transmitter and the receiver,
      calculates a plurality of second signal strength values when a second signal derived from another transmission signal transmitted from the transmitter is received by the receiver, each of the plurality of second signal strength values indicating a strength of the second signal, and the plurality of second signal strength values respectively corresponding to the plurality of complex propagation channel candidates,
      estimates a target complex propagation channel by selecting, from among the plurality of complex propagation channel candidates, a complex propagation channel candidate that corresponds to a minimum difference among differences between the first signal strength value and the plurality of second signal strength values, and estimates a direction of arrival of the first signal relative to the position sensor based on the target complex propagation channel.

2. The position sensor according to claim 1, wherein the processor further estimates a first complex propagation channel as the target complex propagation channel if a temporal variation in the first signal strength value is equal to or smaller than a predetermined value, estimates a second complex propagation channel as the target complex propagation channel if the temporal variation in the first signal strength value is larger than the predetermined value, calculates a first correlation matrix that is a correlation matrix corresponding to the first complex propagation channel, calculates a second correlation matrix that is a correlation matrix corresponding to the second complex propagation channel, calculates a third correlation matrix by subtracting the first correlation matrix from the second correlation matrix, and estimates the direction of arrival of the first signal relative to the position sensor based on the third correlation matrix.

3. The position sensor according to claim 2, wherein the processor determines that the first signal does not include a reflection signal generated by the transmission signal being reflected by the organic body when the temporal variation in the first signal strength value is equal to or smaller than the predetermined value, and the first signal includes the reflection signal when the temporal variation in the first signal strength value is larger than the predetermined value.

4. The position sensor according to claim 1, wherein the processor further estimates a first complex propagation channel as the target complex propagation channel at a first time point, estimates a second complex propagation channel as the target complex propagation channel at a second time point after the first time point, calculates a phase difference between the first complex propagation channel and the second complex propagation channel, determines a phase angle at which the phase difference is minimized, calculates a third complex propagation channel by subtracting the first complex propagation channel to which the phase angle is applied from the second complex propagation channel to which the phase angle is applied, calculates a correlation matrix that corresponds to the third complex propagation channel, and estimates the direction of arrival of the first signal relative to the position sensor based on the target correlation matrix.

5. A position sensor comprising:

at least one reception antenna;

at least one parasitic antenna terminating in a variable load;

a controller that sets an impedance value of the variable load to K different values, K being an integer equal to or larger than two;

a receiver that receives a first signal, the first signal being formed of a combination of a signal received by the reception antenna and a signal received by the parasitic antenna, the signal received by the reception antenna and the signal received by the parasitic antenna being derived from a transmission signal transmitted via a transmitter from the position sensor to a predetermined area in search of an organic body, the signal received by the parasitic antenna corresponding to the set impedance value of the variable load, the first signal being received L times for each of the K different values set as the impedance value of the variable load, and L being an integer equal to or larger than two;

a memory that stores L first signal strength values for each of the K different values set as the impedance value of the variable load; and a processor that calculates average values by averaging the L first signal strength values for each of the K different values set as the impedance value of the variable load, calculates K×L second signal strength values by subtracting, from the L first signal strength values for each of the K different values set as the impedance value of the variable load, a corresponding average value of the average values, sets, for each of L complex propagation channels, M candidates each having K elements, M being an integer equal to or larger than two, the complex propagation channels indicating signal propagation properties between the transmitter and the receiver, calculates, for each of the L complex propagation channels, M third signal strength values each having K elements indicating signal strength values of signals to be received by the receiver when the impedance value of the variable load is set to the K different values, estimates the L complex propagation channels by selecting, for each of the L complex propagation channels, from among the M candidates, a candidate that corresponds to a minimum difference among differences between the M third signal strength values and corresponding second signal strength values of the second signal strength values, calculates a correlation matrix that corresponds to the L complex propagation channels, and estimates a direction of arrival of the first signal relative to the position sensor based on the correlation matrix.

6. A method performed by a position sensor for estimating a direction of arrival of a signal, the position sensor including at least one reception antenna, at least one parasitic antenna terminating in a variable load, a controller, a transmitter, and a receiver, the method comprising:

setting, by the controller, an impedance value of the variable load;

transmitting, via the transmitter, a transmission signal to a predetermined area in search of an organic body;

receiving, by the receiver, a first signal, the first signal being formed of a combination of a signal received by the reception antenna and a signal received by the parasitic antenna, the signal received by the reception antenna and the signal received by the parasitic antenna being derived from the transmission signal, and the signal received by the parasitic antenna corresponding to the set impedance value of the variable load;

calculating a first signal strength value that indicates a strength of the first signal;

setting a plurality of complex propagation channel candidates indicating signal propagation properties between the transmitter and the receiver;

calculating a plurality of second signal strength values when a second signal derived from another transmission signal transmitted from the transmitter is received by the receiver, each of the plurality of second signal strength values indicating a strength of the second signal, and the plurality of second signal strength values respectively corresponding to the plurality of complex propagation channel candidates;

estimating a target complex propagation channel by selecting, from among the plurality of complex propagation channel candidates, a complex propagation channel candidate that corresponds to a minimum difference among differences between the first signal strength value and the plurality of second signal strength values; and estimating a direction of arrival of the first signal relative to the position sensor based on the target complex propagation channel.

7. A method performed by a position sensor for estimating a direction of arrival of a signal, the position sensor including at least one reception antenna, at least one parasitic antenna terminating in a variable load, a controller, a transmitter and a receiver, the method comprising:

setting, by the controller, an impedance value of the variable load to K different values, K being an integer equal to or larger than two;

receiving, by the receiver, a first signal L times for each of the K different values set as the impedance value of the variable load, L being an integer equal to or larger than two;

storing L first signal strength values for each of the K different values set as the impedance value of the variable load, each of the L first signal strength values indicating a strength of the first signal;

calculating average values by averaging the L first signal strength values for each of the K different values set as the impedance value of the variable load;

calculating K×L second signal strength values by subtracting, from the L first signal strength values for each of the K different values set as the impedance value of the variable load, a corresponding average value of the average values;

setting, for each of L complex propagation channels, M candidates each having K elements, M being an integer equal to or larger than two, the complex propagation channels indicating signal propagation properties between the transmitter and the receiver;

calculating, for each of the L complex propagation channels, M third signal strength values each having K elements indicating signal strength values of signals supposed to be received by the receiver when the impedance value of the variable load is set to the K different values;

estimating the L complex propagation channels by selecting, for each of the L complex propagation channels, from among the M candidates, a candidate that corresponds to a minimum difference among differences between the M third signal strength values and corresponding second signal strength values of the second signal strength values;

calculating a correlation matrix that corresponds to the L complex propagation channels; and estimating a direction of arrival of the first signal relative to the position sensor based on the correlation matrix.

8. A system comprising:
a first position sensor disposed at a first position;
a second position sensor disposed at a second position different from the first position; and
a first processor,
wherein
the first position sensor includes:
   at least one first reception antenna,
   at least one first parasitic antenna terminating in a first variable load,
   a first controller that sets an impedance value of the first variable load,
   a first transmitter that transmits a first transmission signal to a first predetermined area in search of an organic body,
   a first receiver that receives a first signal, the first signal being formed of a combination of a signal received by the first reception antenna and a signal received by the first parasitic antenna, the signal received by the first reception antenna and the signal received by the first parasitic antenna being derived from the first transmission signal, the signal received by the first parasitic antenna corresponding to the set impedance value of the first variable load,
   a first memory that stores, when the impedance value of the first variable load is set by the first controller, a first signal strength value that indicates a strength of the first signal corresponding to the set impedance value of the first variable load, and
   a second processor that
      sets a plurality of first complex propagation channel candidates indicating signal propagation properties between the first transmitter and the first receiver,
      calculates a plurality of second signal strength values when a second signal derived from a second transmission signal transmitted from the first transmitter is received by the first receiver, each of the plurality of second signal strength values indicating a strength of the second signal, the plurality of second signal strength values respectively corresponding to the plurality of first complex propagation channel candidates,
      estimates a target first complex propagation channel by selecting, from among the plurality of first complex propagation channel candidates, a first complex propagation channel candidate that corresponds to a minimum difference among differences between the first signal strength value and the plurality of second signal strength values, and
      estimates a first direction of arrival of the first signal relative to the first position sensor based on the target first complex propagation channel,
the second position sensor includes:
   at least one second reception antenna,
   at least one second parasitic antenna terminating in a second variable load,
   a second controller that sets an impedance value of the second variable load,
   a second transmitter that transmits a third transmission signal to a second predetermined area in search of the organic body,
   a second receiver that receives a third signal, the third signal being formed of a combination of a signal received by the second reception antenna and a signal received by the second parasitic antenna, the signal received by the second reception antenna and the signal received by the second parasitic antenna being derived from the third transmission signal, and the signal received by the second parasitic antenna corresponding to the set impedance value of the second variable load, a second memory that stores, when the impedance value of the second variable load is set by the second controller, a third signal strength value that indicates a strength of the third signal corresponding to the set impedance value of the second variable load, and a third processor that sets a plurality of second complex propagation channel candidates indicating signal propagation properties between the second transmitter and the second receiver, calculates a plurality of fourth signal strength values when a fourth signal derived from a fourth transmission signal transmitted from the second transmitter is received by the second receiver, each of the plurality of fourth signal strength values indicating a strength of the fourth signal, the plurality of fourth signal strength values respectively corresponding to the plurality of second complex propagation channel candidates, estimates a target second complex propagation channel by selecting, from among the plurality of second complex propagation channel candidates, a second complex propagation channel candidate that corresponds to a minimum difference among differences between the third signal strength value and the plurality of fourth signal strength values, and estimates a second direction of arrival of the third signal relative to the second position sensor based on the target second complex propagation channel, and the first processor estimates a position of the organic body relative to the first position sensor and the second position sensor based on the first direction of arrival and the second direction of arrival.

* * * * *